(12) United States Patent
Park et al.

(10) Patent No.: US 12,513,311 B2
(45) Date of Patent: Dec. 30, 2025

(54) IMAGE SIGNAL PROCESSING DEVICE AND OPERATION METHOD THEREOF

(71) Applicant: Samsung Electronics Co., Ltd., Suwon-si (KR)

(72) Inventors: Keun Joo Park, Suwon-si (KR); Junhyuk Park, Suwon-si (KR); Jiwon Im, Suwon-si (KR); Junseok Kim, Suwon-si (KR)

(73) Assignee: Samsung Electronics Co., LTD., Gyeonggi-Do (KR)

( * ) Notice: Subject to any disclaimer, the term of this patent is extended or adjusted under 35 U.S.C. 154(b) by 350 days.

(21) Appl. No.: 18/321,278

(22) Filed: May 22, 2023

(65) Prior Publication Data

US 2024/0089471 A1    Mar. 14, 2024

(30) Foreign Application Priority Data

Sep. 13, 2022    (KR) .......................... 10-2022-0114865

(51) Int. Cl.
*H04N 19/182*    (2014.01)
*H04N 19/126*    (2014.01)
*H04N 19/132*    (2014.01)
*H04N 19/186*    (2014.01)

(52) U.S. Cl.
CPC ......... *H04N 19/182* (2014.11); *H04N 19/126* (2014.11); *H04N 19/132* (2014.11); *H04N 19/186* (2014.11)

(58) Field of Classification Search
CPC .. H04N 19/182; H04N 19/126; H04N 19/132; H04N 19/186; H04N 5/2628; H04N 5/268; H04N 25/70; H04N 25/44; H04N 23/45; H04N 23/80; H04N 25/53; G06T 3/4084

See application file for complete search history.

(56) References Cited

U.S. PATENT DOCUMENTS

| | | | |
|---|---|---|---|
| 6,825,876 B1 | 11/2004 | Easwar et al. |
| 7,804,537 B2 | 9/2010 | Storm et al. |
| 9,118,861 B2 | 8/2015 | Shibata |
| 9,131,160 B2 | 9/2015 | Lin et al. |
| 9,961,291 B2 | 5/2018 | Chen |
| 10,491,899 B2 | 11/2019 | Galpin et al. |
| 10,567,826 B2 | 2/2020 | De Haan et al. |

(Continued)

FOREIGN PATENT DOCUMENTS

JP    2003-230147 A    8/2003

*Primary Examiner* — Juan M Guillermety
(74) *Attorney, Agent, or Firm* — Harness, Dickey & Pierce, P.L.C.

(57) ABSTRACT

An operation method of an image signal processing device includes receiving a raw pixel code from an external image sensor device including an image pixel, generating a non-linear pixel code by performing non-linear mapping on the raw pixel code, and outputting a downsized pixel code obtained by performing a masking operation on bit positions including a first bit position corresponding to a most significant bit of the non-linear pixel code and a second bit position corresponding to a least significant bit of the non-linear pixel code. An amplitude of the raw pixel code is linear to illuminance of a light incident onto the image pixel, an amplitude of the non-linear pixel code is non-linear to the amplitude of the raw pixel code, and the non-linear pixel code has a first code length, and the downsized pixel code has a second code length smaller than the first code length.

20 Claims, 14 Drawing Sheets

(56) References Cited

U.S. PATENT DOCUMENTS

| | | |
|---|---|---|
| 10,872,553 B2 | 12/2020 | Hoffman |
| 2021/0166434 A1 | 6/2021 | Miyauchi |
| 2022/0004798 A1 | 1/2022 | Zhu et al. |
| 2022/0094923 A1 | 3/2022 | Bossen et al. |

| Pixel Index | Illuminance(lx) | RPC | RPC Amplitude |
|---|---|---|---|
| PX1 | 100 | 0000000001 | 1 |
| PX2 | 200 | 0000000010 | 2 |
| PX3 | 1000 | 0000001010 | 10 |
| PX4 | 40000 | 0110011001 | 409 |
| PX5 | 80000 | 1100110011 | 819 |

| Pixel Index | Illuminance(lx) | RPC | RPC Amplitude | NLPV Amplitude |
|---|---|---|---|---|
| PX1 | 100 | 0000000001 | 1 | 102.40 |
| PX2 | 200 | 0000000010 | 2 | 117.81 |
| PX3 | 1000 | 0000001010 | 10 | 153.60 |
| PX4 | 40000 | 0110011001 | 409 | 235.63 |
| PX5 | 80000 | 1100110011 | 819 | 251.04 |

| Pixel Index | Illuminance(lx) | NLPV Amplitude | NLPC |
|---|---|---|---|
| PX1 | 100 | 102.40 | 01100111 |
| PX2 | 200 | 117.81 | 01110110 |
| PX3 | 1000 | 153.60 | 10011010 |
| PX4 | 40000 | 235.63 | 11101100 |
| PX5 | 80000 | 251.04 | 11111100 |

| Pixel Index | DPC at T1 | DPC at T2 | |△DPC| | Event Detection |
|---|---|---|---|---|
| PX1 | 11 | 01 | 2 | Yes |
| PX2 | 10 | 01 | 1 | No |
| PX3 | 10 | 10 | 0 | No |
| PX4 | 00 | 01 | 1 | No |
| PX5 | 00 | 10 | 2 | Yes |

IMAGE SIGNAL PROCESSING DEVICE AND OPERATION METHOD THEREOF

CROSS-REFERENCE TO RELATED APPLICATIONS

This application claims priority under 35 U.S.C. § 119 to Korean Patent Application No. 10-2022-0114865 filed on Sep. 13, 2022, in the Korean Intellectual Property Office, the disclosure of which is incorporated by reference herein in its entirety.

BACKGROUND

Nowadays, the research on machine vision using an image sensor device is actively conducted. For example, there is being actively conducted the research on the way to perform various functions, such as object identification, object recognition, object detection, and motion detection, based on image data collected through the image sensor device.

An existing image sensor device has been developed to generate image data similar to an image that is capable of being recognized by human eyes. That is, the existing image sensor device has been developed to generate and process a larger amount of data within a possible range. However, when a machine vision system is implemented by using the existing image sensor device, a large amount of computation may be unnecessarily performed. In this case, a processing speed of the machine vision system may decrease, and power consumption may increase.

SUMMARY

Some example embodiments of the inventive concepts described herein relate to an image signal processing device and an operation method thereof. More particularly, some example embodiments relate to an image signal processing device downsizing image data and an operation method thereof.

Some example embodiments of the inventive concepts provide an image signal processing device downsizing image data for machine vision and an operation method thereof.

According to some example embodiments, an operation method of an image signal processing device may include receiving a raw pixel code from an external image sensor device including an image pixel, generating a non-linear pixel code by performing non-linear mapping on the raw pixel code, and outputting a downsized pixel code obtained by performing a masking operation on a plurality of bit positions including a first bit position corresponding to a most significant bit of the non-linear pixel code and a second bit position corresponding to a least significant bit of the non-linear pixel code. An amplitude of the raw pixel code may be linear to illuminance of a light incident onto the image pixel, an amplitude of the non-linear pixel code may be non-linear to the amplitude of the raw pixel code, the non-linear pixel code may have a first code length, and the downsized pixel code may have a second code length smaller than the first code length.

According to some example embodiments, an image system may include an image sensor device including first processing circuitry configured to generate a first raw pixel code based on a light of first illuminance, generate a second raw pixel code based on a light of second illuminance, and generate a third raw pixel code based on a light of third illuminance, and an image signal processing device including second processing circuitry configured to receive the first to third raw pixel codes, generate first to third non-linear pixel codes respectively based on the first to third raw pixel codes, generate first to third downsized pixel codes by masking some bit positions of each of the first to third non-linear pixel codes, and output the first to third downsized pixel codes. The second illuminance may be higher than the first illuminance and may be lower than the third illuminance. A ratio of an amplitude difference of the first and second raw pixel codes to a difference between the first illuminance and the second illuminance may correspond to a ratio of an amplitude difference of the second and third raw pixel codes to a difference between the second illuminance and the third illuminance. A ratio of an amplitude difference of the first and second non-linear pixel codes to the difference between the first illuminance and the second illuminance may be greater than a ratio of an amplitude difference of the second and third non-linear pixel codes to the difference between the second illuminance and the third illuminance.

According to some example embodiments, an image sensor device may include a pixel array that includes a plurality of image pixels configured to generate a plurality of analog pixel voltages, respectively, an analog-to-digital converter configured to convert the plurality of analog pixel voltages into a plurality of raw pixel codes, respectively, an image signal processor configured to generate a plurality of non-linear pixel codes each having a first code length, by performing non-linear mapping for the plurality of raw pixel codes, and generate a plurality of downsized pixel codes by masking some bit positions of each of the plurality of non-linear pixel codes, and an output buffer configured to receive the plurality of downsized pixel codes and to output a downsized image.

BRIEF DESCRIPTION OF THE FIGURES

The above and other objects and features of the inventive concepts will become apparent by describing in detail some example embodiments thereof with reference to the accompanying drawings.

DETAILED DESCRIPTION

Below, some example embodiments of the inventive concepts will be described in detail and clearly to such an extent that one skilled in the art easily carries out the inventive concepts. In the following description, specific details such as detailed components and structures are merely provided to assist the overall understanding of some example embodiments of the inventive concepts. Therefore, it should be apparent to those skilled in the art that various changes and modifications of the example embodiments described herein may be made without departing from the scope and spirit of the inventive concepts. In addition, the descriptions of well-known functions and structures are omitted for clarity and brevity. In the following drawings or in the detailed description, components may be connected with any other components except for components illustrated in a drawing or described in the detailed description. The terms described in the specification are terms defined in consideration of the functions in the inventive concepts and are not limited to a specific function. The definitions of the terms should be determined based on the contents throughout the specification.

In the detailed description, components that are described with reference to the terms "driver", "block", "unit", etc. will be implemented with software, hardware, or a combination thereof. For example, the software may be a machine code, firmware, an embedded code, and application software. For example, the hardware may include an electrical circuit, an electronic circuit, a processor, a computer, integrated circuit cores, a pressure sensor, an inertial sensor, a micro electro mechanical system (MEMS), a passive element, or a combination thereof.

Figure 1:
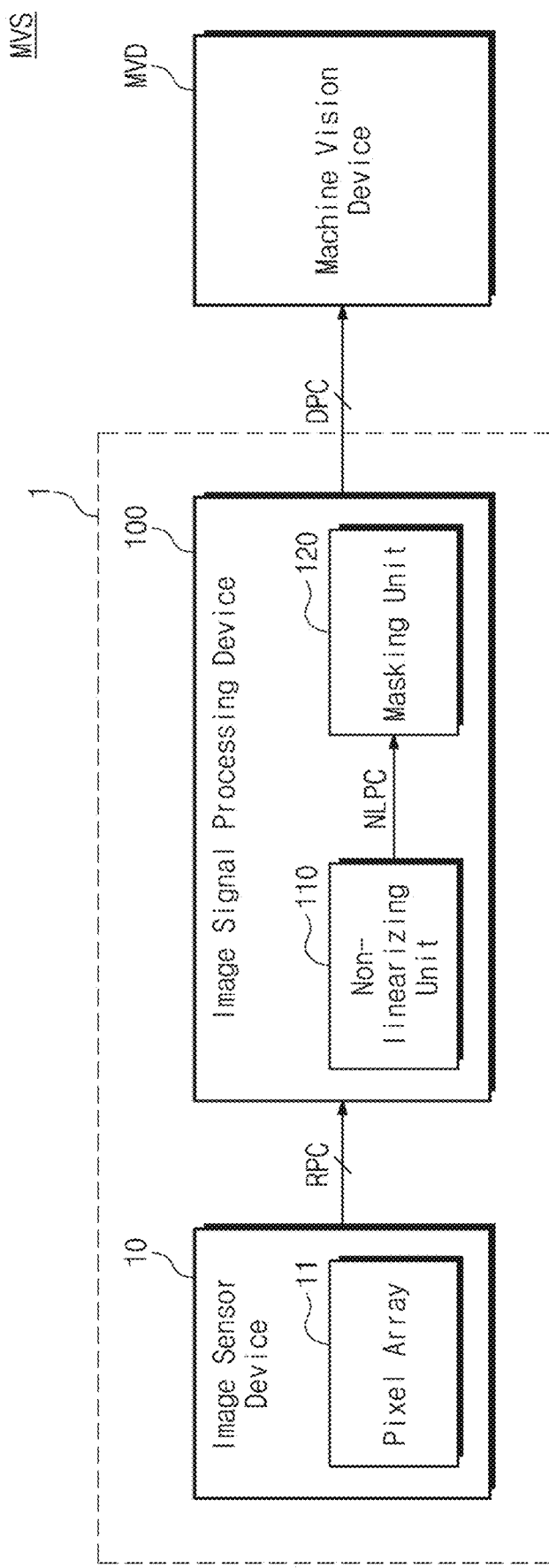
FIG. 1 is a block diagram illustrating a machine vision system according to some example embodiments of the inventive concepts.

FIG. 1 is a block diagram illustrating a machine vision system according to some example embodiments of the inventive concepts. Referring to FIG. 1, a machine vision system MVS may include an image system 1 and a machine vision device MVD. The image system 1 may include an image sensor device 10 and/or an image signal processing device 100.

In some example embodiments, the machine vision system MVS may be included in a virtual reality (VR) device or an artificial reality (AR) device, but the inventive concepts are not limited thereto. For example, the machine vision system MVS may be included in one of various types of electronic devices that recognize image data collected through an image sensor device and operate based on the recognized image data.

The image sensor device 10 may include a pixel array 11. The pixel array 11 may include a plurality of image pixels arranged in a row direction and a column direction. Each, or one or more, of the plurality of image pixels may include one or more photodiodes. The photodiode may integrate charges depending on the illuminance of a light received from the outside.

The image sensor device 10 may generate a plurality of raw pixel codes RPC based on the charges integrated in the photodiodes of the plurality of image pixels. Each, or one or more, of the plurality of raw pixel codes RPC may refer to a digital signal. An amplitude of each, or one or more, of the plurality of raw pixel codes RPC may be linear to the illuminance of the light incident onto the photodiode of the corresponding image pixel (below, for brief description, the expression "illuminance of a light incident onto an image pixel" is used). A relationship between a raw pixel code and the illuminance of a light incident onto an image pixel will be described in detail with reference to FIG. 3.

In some example embodiments, a code length of the raw pixel code RPC may be 8-bit or more. For example, the code length of the raw pixel code RPC may be 8-bit or 10-bit. However, the inventive concepts are not limited to the above code length of the raw pixel code RPC.

In some example embodiments, the code length may refer to the number of bits of a corresponding binary code.

In some example embodiments, the code length may be also referred to as a "code size".

The image signal processing device 100 may generate a plurality of downsized pixel codes DPC based on the plurality of raw pixel codes RPC. In this case, each, or one or more, of the plurality of downsized pixel codes DPC may be a digital signal smaller in capacity than the raw pixel codes RPC. That is, the image signal processing device 100 may generate the plurality of downsized pixel codes DPC by reducing the code length of the plurality of raw pixel codes RPC so as to be appropriate for the application to the machine vision. For example, the image signal processing device 100 may include a non-linearizing unit 110 and/or a masking unit 120.

The non-linearizing unit 110 may generate non-linear pixel codes NLPC based on the plurality of raw pixel codes RPC. For example, the non-linearizing unit 110 may generate the non-linear pixel codes NLPC by non-linearizing the plurality of raw pixel codes RPC, respectively. In this case, unlike the raw pixel codes RPC, the amplitude of each, or one or more, non-linear pixel code NLPC may be non-linear to the illuminance of the light incident onto the corresponding image pixel. A configuration and an operation of the non-linearizing unit 110 will be described in detail with reference to FIG. 2, and a relationship between a non-linear pixel code and the illuminance of a light incident onto a corresponding image pixel will be described in detail with reference to FIGS. 5 and 6.

In some example embodiments, as the plurality of raw pixel codes RPC are mapped to the non-linear pixel codes NLPC, the non-linear pixel codes NLPC may change greatly in a specific illuminance environment. In detail, a variation of a non-linear pixel code according to a change in the illuminance of light in a low-illuminance environment may be greater than a variation of a non-linear pixel code according to a change in the illuminance of light in a high-illuminance environment. However, the inventive concepts are not limited thereto, and how the image signal processing device 100 generates a plurality of non-linear pixel codes will be described in detail with reference to FIGS. 2 to 9.

In some example embodiments, each, or one or more, of the non-linear pixel codes NLPC may be a digital signal whose capacity is smaller than or equal to that of the raw pixel code RPC. Each, or one or more, of the non-linear pixel codes NLPC may be a digital signal whose capacity is greater than or equal to that of the downsized pixel code DPC.

In some example embodiments, the code length of the non-linear pixel code NLPC may be smaller than or equal to the code length of the raw pixel code RPC. For example, the code length of the non-linear pixel code NLPC may be smaller than or equal to 4-bit or 8-bit. However, the inventive concepts are not limited to the above code length of the non-linear pixel code. That is, the code length of the non-linear pixel code NLPC may be determined based on factors such as a detailed purpose (e.g., function) of the machine vision system MVS, an operating environment of the image system 1, and/or performance of the machine vision system MVS.

The masking unit 120 may mask the non-linear pixel codes NLPC. That is, the masking unit 120 may generate the plurality of downsized pixel codes DPC by masking a portion of each, or one or more, of the plurality of non-linear pixel codes NLPC.

In detail, the masking unit 120 may select and mask a specific bit position of the non-linear pixel codes NLPC. For example, the masking unit 120 may select and mask same bit positions for each, or one or more, of the non-linear pixel codes NLPC.

The masking unit 120 may determine bits of unmasked bit positions as the plurality of downsized pixel codes DPC. That is, the masking unit 120 may determine only a portion of the non-linear pixel code NLPC as the non-linear pixel code NLPC. An operation of the masking unit 120 will be described in detail with reference to FIG. 8.

In some example embodiments, the code length of the downsized pixel code DPC may be smaller than or equal to the code length of the non-linear pixel code NLPC. For example, the code length of the downsized pixel code DPC may be 1-bit or more and 4-bit or less. However, the inventive concepts are not limited to the above code length of the downsized pixel code DPC. That is, the code length of the non-linear pixel code may be determined based on the detailed purpose (e.g., function) of the machine vision system MVS.

The machine vision device MVD may perform a machine visioning operation based on the downsized pixel code DPC. For example, the machine vision device MVD may perform one or more of the following functions based on the downsized pixel code DPC in the machine learning scheme: object identification, object recognition, object detection, motion detection, video-tracking, and/or edge detection.

In some example embodiments, the machine vision device MVD may include at least one or more of various computational devices such as a processor and/or a neural processor.

In some example embodiments, as the code length of the downsized pixel code DPC becomes smaller, the computation load of the machine vision device MVD may decrease. In contrast, as the code length of the downsized pixel code DPC becomes greater, the computation load of the machine vision device MVD may increase.

In some example embodiments, the code length of the downsized pixel code DPC may be determined depending on the operation of the machine vision device MVD. For example, when the machine vision device MVD performs the object identification function (e.g., human gender identification), the code length of the downsized pixel code DPC may be 8-bit. That is, in this case, the code length of the downsized pixel code DPC may be similar to that of the raw pixel code RPC. Alternatively, in this case, the image signal processing device 100 may not reduce the code length of the raw pixel code RPC (e.g., a downsized pixel code may have the same code length as a raw pixel code).

In some example embodiments, when the machine vision device MVD performs the object recognition function (e.g., human and animal identification), the downsized pixel code DPC may be 3-bit.

In some example embodiments, when the machine vision device MVD performs the object detection function (e.g., obstacle recognition), the code length of the downsized pixel code DPC may be 1-bit or 2-bit.

In some example embodiments, when the machine vision device MVD performs the motion detection function (e.g., object motion detection), the code length of the downsized pixel code DPC may be 2-bit. In this case, even though the image pixels of the image sensor device 10 do not include single photon avalanche diode (SPAD), the machine vision device MVD may perform the motion detection function based on data of a small code length (e.g., the downsized pixel code DPC). That is, according to some example embodiments of the inventive concepts, because the image pixels of the pixel array 11 are capable of performing a function similar to a function of a dynamic vision sensor (DVS) without the SPAD, the machine vision system MVS (in detail, the pixel array 11) may be made smaller.

In some example embodiments, when the machine vision device MVD performs a video-tracking function (e.g., a function in which a field of vision of a screen displayed in the virtual reality (VR)/artificial reality (AR) headset is rotated as the user wearing the VR/AR headset rotates his/her head from side to side), the code length of the downsized pixel code DPC may be 4-bit or less.

That is, according to some example embodiments of the inventive concepts, the raw pixel code RPC may be downsized such that the downsized pixel code DPC is output. Compared to the case where the machine vision device MVD operates directly based on the raw pixel code RPC, the computation load of the machine vision device MVD may decrease when the machine vision device MVD operates based on the downsized pixel code DPC. In this case, an operating speed of the machine vision system MVS may be improved, and power consumption may decrease.

Also, the performance of the machine vision device MVD may be improved when factors such as a code length of a non-linear pixel code, a bit position to be masked, and a code length of the downsized pixel code DPC are appropriately determined depending on the inventive concept of the machine vision device MVD.

Figure 2:
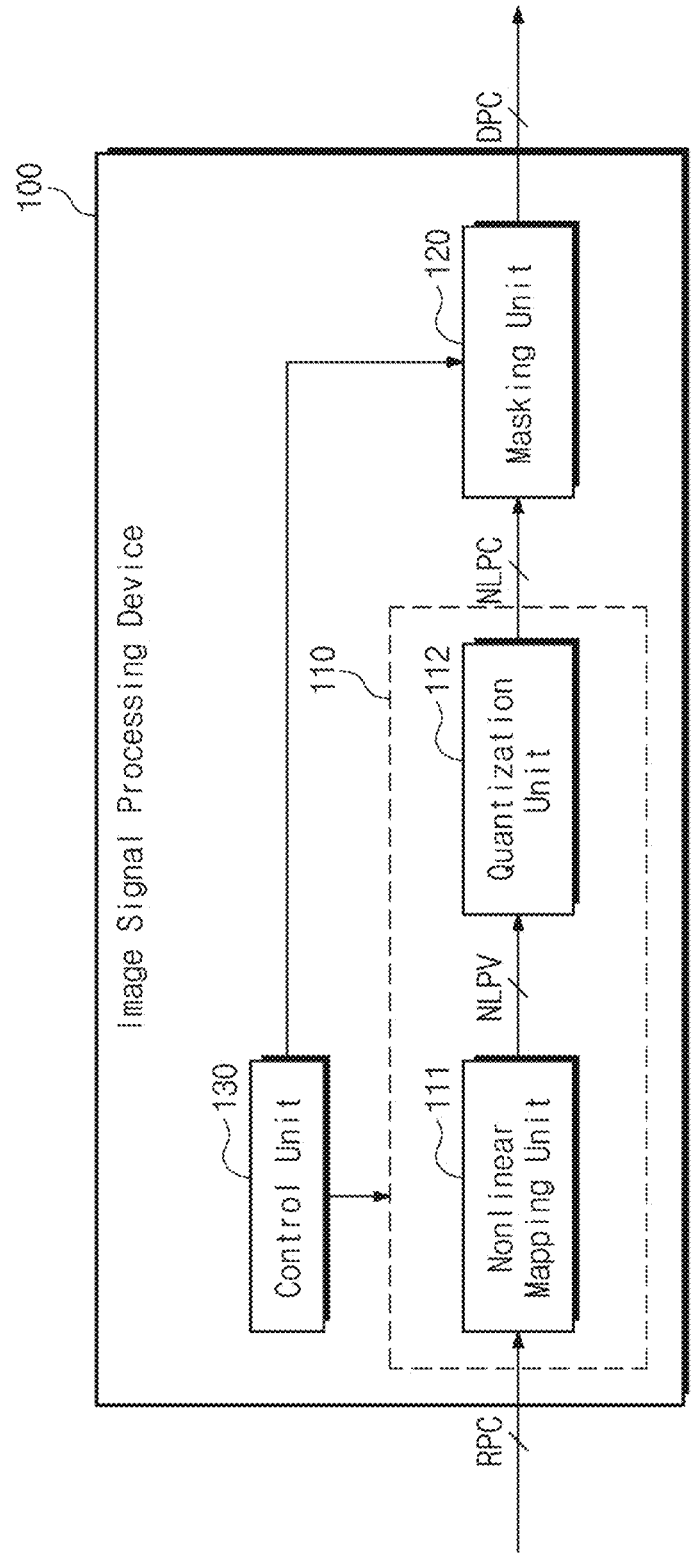
FIG. 2 is a block diagram illustrating an image signal processing device of FIG. 1 in detail.

FIG. 2 is a block diagram illustrating an image signal processing device of FIG. 1 in detail. Referring to FIGS. 1 and 2, the image signal processing device 100 may include the non-linearizing unit 110, the masking unit 120, and/or a control unit 130. The non-linearizing unit 110 may include a non-linear mapping unit 111 and/or a quantization unit 112.

For brief description, an example in which the non-linearizing unit 110 includes the non-linear mapping unit 111 and the quantization unit 112 is illustrated in FIG. 2, but the inventive concepts are not limited thereto. For example, the non-linearizing unit 110 may directly map the plurality of raw pixel codes RPC to the plurality of non-linear pixel codes NLPC. However, according to some example embodiments the plurality of raw pixel codes RPC are mapped to non-linear pixel values NLPV and are then converted into the non-linear pixel codes NLPC.

The non-linear mapping unit 111 may receive the plurality of raw pixel codes RPC. The non-linear mapping unit 111 may perform non-linear mapping for each, or one or more, of the plurality of raw pixel codes RPC. That is, the non-linear mapping unit 111 may map the plurality of raw pixel codes RPC to the non-linear pixel values NLPV. In this case, unlike the raw pixel codes RPC, each, or one or more, non-linear pixel value NLPV may be non-linear to the illuminance of a light incident onto the corresponding image pixel.

For example, under control of the control unit 130, the non-linear mapping unit 111 may map the raw pixel codes RPC to the non-linear pixel values NLPV such that the non-linear pixel values NLPV and the amplitudes of the corresponding raw pixel codes RPC have a specific function relationship. Alternatively, the non-linear mapping unit 111 may map the raw pixel codes RPC to the non-linear pixel values NLPV, so that each, or one or more, non-linear pixel value NLPV and the illuminance of the light incident onto the corresponding image pixel have a specific function relationship.

In some example embodiments, each, or one or more, non-linear pixel value NLPV and the amplitudes of the plurality of corresponding raw pixel codes RPC may have a logarithmic function relationship or an exponential function relationship. However, the inventive concepts are not limited thereto. For example, the non-linear pixel values NLPV and the amplitudes of the corresponding plurality of raw pixel codes RPC may have one of various types of non-linear function relationships such as a logarithmic function relationship, an exponential function relationship, a polynomial function relationship, and/or a trigonometric function relationship or a combination thereof. An amplitude relationship between the non-linear pixel values NLPV and the raw pixel codes RPC and a relationship between each, or one or more, non-linear pixel value NLPV and the illuminance of a light incident onto the corresponding image pixel will be described in detail with reference to FIG. 5.

The quantization unit 112 may quantize the non-linear pixel values NLPV to generate the non-linear pixel codes NLPC. For example, the quantization unit 112 may normalize an interval, in which the non-linear pixel values NLPV are included, into a plurality of intervals. In this case, the intervals may respectively correspond to different non-linear pixel codes. The quantization unit 112 may determine the intervals where the plurality of non-linear pixel values NLPV are included and may generate the non-linear pixel codes NLPC. How the quantization unit 112 determines a non-linear pixel code corresponding to a specific non-linear pixel value will be described in detail with reference to FIGS. 7 to 9.

In some example embodiments, the quantization unit 112 may normalize the interval from a non-linear pixel value corresponding to a raw pixel code where bit values of all bit positions are "0" to a non-linear pixel value corresponding to a raw pixel code where bit values of all bit positions are "1" (e.g., a full-code), into the plurality of intervals. However, the inventive concepts are not limited thereto. For example, the quantization unit 112 may normalize the interval from a non-linear pixel value corresponding to a raw pixel code having the smallest amplitude from among the plurality of raw pixel codes RPC to a non-linear pixel value corresponding to a raw pixel code having the greatest amplitude from among the plurality of raw pixel codes RPC, into the plurality of intervals. In this case, under control of the control unit 130, the quantization unit 112 may receive the plurality or raw pixel codes RPC, may identify a raw pixel code having the greatest amplitude from among the plurality of raw pixel codes RPC and a raw pixel code having the smallest amplitude from among the plurality of raw pixel codes RPC, and may normalize the interval between non-linear pixel values corresponding to the identified raw pixel codes into the plurality of intervals. However, for brief description, some example embodiments in which the quantization unit 112 normalizes the interval from the non-linear pixel value corresponding to the raw pixel code where bit values of all bit positions are "0" to the non-linear pixel value corresponding to a raw pixel code being the full-code into the plurality of intervals will be described below.

The masking unit 120 may mask the non-linear pixel codes NLPC to output the downsized pixel codes DPC. The masking unit 120 may mask the same bit positions with respect to the plurality of non-linear pixel codes NLPC. In this case, in each, or one or more, of the non-linear pixel codes NLPC, bits whose positions are not masked may correspond to the corresponding downsized pixel code DPC.

The control unit 130 may control the overall operation of the image signal processing device 100.

The control unit 130 may control the non-linear mapping unit 111. For example, the control unit 130 may determine a function relationship between each, or one or more, non-linear pixel value NLPV and an amplitude of the corresponding raw pixel code RPC.

The control unit 130 may control the quantization unit 112. For example, the control unit 130 may determine the code length of the non-linear pixel codes NLPC.

The control unit 130 may control the masking unit 120. For example, the control unit 130 may determine a bit position to be marked with regard to the plurality of non-linear pixel codes NLPC. Also, the control unit 130 may determine the code length of the downsized pixel code DPC.

In some example embodiments, depending on the purpose (e.g., function) of the machine vision device MVD, the control unit 130 may appropriately determine the above factors such as the code length of the non-linear pixel code, the bit position to be masked, and/or the code length of the downsized pixel code DPC. In this case, the efficiency of operation of the machine vision device MVD may be improved.

Figures 3, 4:
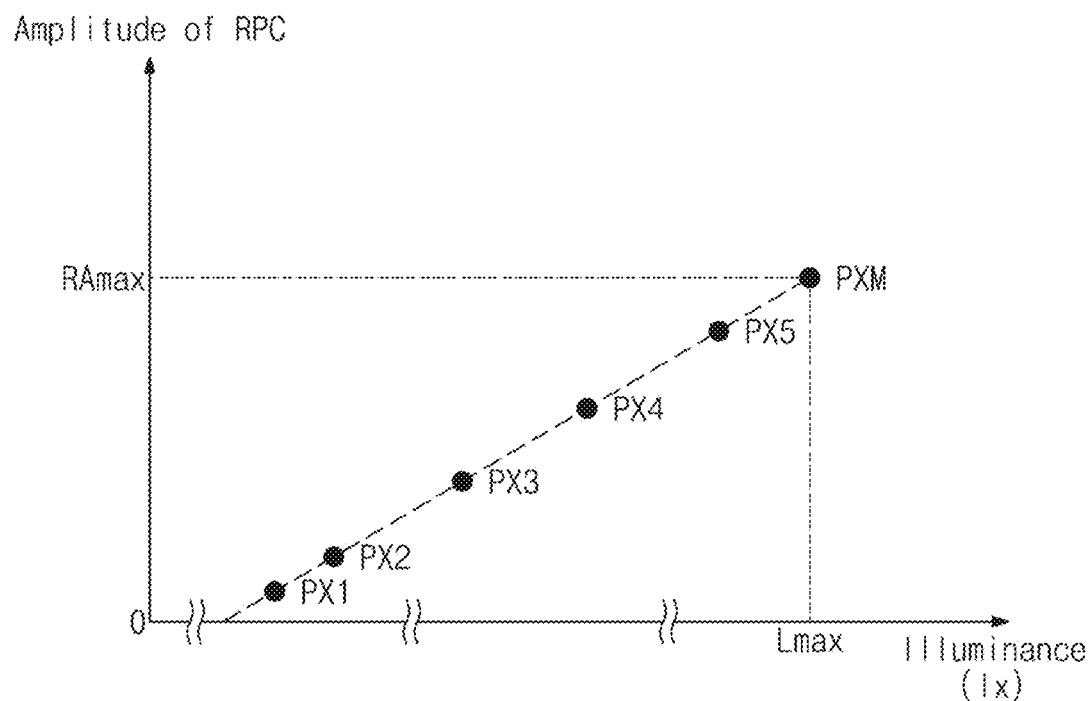
FIG. 3 is a graph illustrating a relationship between illuminance of a light incident onto an image pixel and an amplitude of a raw pixel code.
FIG. 4 is a diagram illustrating an example of illuminance of an incident light and a raw pixel code for first to fifth image pixels of FIG. 3.

FIG. 3 is a graph illustrating a relationship between illuminance of a light incident onto an image pixel and an amplitude of a raw pixel code. Referring to FIGS. 1 to 3, the pixel array 11 may include a plurality of image pixels. Below, a relationship between the illuminance of a light incident onto each, or one or more, of image pixels PX1 to PX5 among the plurality of image pixels and an amplitude of a raw pixel code will be described. However, the inventive concepts are not limited to the number of image pixels included in the pixel array 11.

As described above, the amplitude of each, or one or more, of the plurality of raw pixel codes RPC may be linear to the illuminance of a light incident onto the corresponding image pixel. For example, the illuminance of the light incident onto each, or one or more, of the first to fifth image pixels PX1 to PX5 and the amplitude of the raw pixel code may have a linear function relationship. In detail, $AMP_{RPC}$(k) being the amplitude of the raw pixel code generated from the k-th image pixel may be expressed by a function of illuminance LUX k of the light incident onto the k-th image pixel, like Equation 1 below.

$$AMP_{RPC}(k)=C1*LUX_k+C2 \qquad \text{[Equation 1]}$$

In Equation 1 above, k may be an integer of 1 or more, and C1 and C2 may be constants. Below, for brief description, it is assumed that the constant C2 is 0.

That is, a ratio (e.g., slope of the graph) of a raw pixel code difference of two arbitrary image pixels and an illuminance difference between the two image pixels may be uniform. For example, referring to the first to third image pixels PX1 to PX3, a ratio that is obtained by dividing, a difference between first and second illuminance (which is the illuminance of light incident onto the first and second image pixels PX1 and PX2) by an amplitude difference of first and second raw pixel codes (which is raw pixel codes of the first and second image pixels PX1 and PX2) may be a first ratio. In this case, a ratio that is obtained by dividing a difference between second and third illuminance (which is the illuminance of light incident onto the second and third image pixels PX2 and PX3) by an amplitude difference of second and third raw pixel codes (which is raw pixel codes of the second and third image pixels PX2 and PX3) may correspond to the first ratio (e.g., may be substantially identical to the first ratio).

In some example embodiments, each, or one or more, of the plurality of raw pixel codes RPC may have a finite (or limited) code length. For example, the code length of each, or one or more, of the plurality of raw pixel codes RPC is 10-bit, the raw pixel code having the greatest amplitude may be "$1111111111_{(2)}$". In this case, the amplitude of the raw pixel code expressed in decimal notation may be $1023_{(10)}$. (e.g., $2^{10}-1$) (below, for brief description, it is assumed an amplitude of one number is expressed in decimal notation unless otherwise defined. For example, "11" may refer to an eleven, and "$11_{(2)}$" may refer to a binary number corresponding to "3" in decimal notation.)

Below, for brief description, the amplitude of the raw pixel code having a maximum amplitude according to the code length of the plurality of raw pixel codes RPC is referred to as a "maximum raw pixel code amplitude RAmax". An image pixel having the maximum raw pixel code amplitude RAmax is referred to as a "maximum illuminance pixel PXM". Also, the illuminance of the light incident onto the maximum illuminance pixel PXM is referred to as "maximum illuminance Lmax". However, the inventive concepts are not limited to the above expressions/terms.

In some example embodiments, when an arbitrary image pixel receives a light whose illuminance is the maximum illuminance Lmax or more, a raw pixel code corresponding to the arbitrary image pixel may be the full-code (e.g., a code where bit values of all bit positions are "1"). Below, for brief description, it is assumed that the maximum illuminance Lmax is 100000 lx.

FIG. 4 is a diagram illustrating an example of illuminance of an incident light and a raw pixel code for first to fifth image pixels of FIG. 3. Referring to FIGS. 1 to 4, the illuminance of the light incident onto the first to fifth image pixels PX1 to PX5 may be 100 lx, 200 lx, 1000 lx, 40000 lx, and 80000 lx, respectively.

For example, the illuminance in a normal indoor environment may be 100 to 1000 lx, and the illuminance of direct sunlight may be 30000 to 100000 lx. However, the inventive concepts are not limited thereto.

Raw pixel codes generated from the first to fifth image pixels PX1 to PX5 may respectively be "$0000000001_{(2)}$", "$0000000010_{(2)}$", "$0000001010_{(2)}$", "$0110011001_{(2)}$", and "$1100110011_{(2)}$". In this case, the amplitudes of the raw pixel codes respectively corresponding to the first to fifth image pixels PX1 to PX5 may respectively be "1", "2", "10", "409", and "819".

As described above, according to some example embodiments of the inventive concepts, the amplitude of each, or one or more, of the plurality of raw pixel codes RPC may be linear to the illuminance of the light incident onto the corresponding image pixel. As such, when the machine vision device MVD operates based on the raw pixel codes RPC, the computation operation of the machine vision device MVD may be inefficient.

In some example embodiments, when the machine vision device MVD performs the video-tracking function (e.g., a function in which a field of vision of a screen displayed in the virtual reality (VR)/artificial reality (AR) headset is rotated as the user wearing the VR/AR headset rotates his/her head from side to side), it may be expected that the machine vision system MVS operates in the normal indoor environment. That is, it may be expected that image data targeted for the processing of the machine vision system MVS, from among the data generated from the image sensor device 10, mostly are data of 1000 lx or less (e.g., data having the illuminance of the normal indoor environment). In other words, when the machine vision device MVD performs the computation operation based on the light of 1000 lx or more, the computation operation may be expected to be inefficient. Below, some example embodiments of the inventive concepts for improving the above inefficiency will be described.

Figures 5, 6:
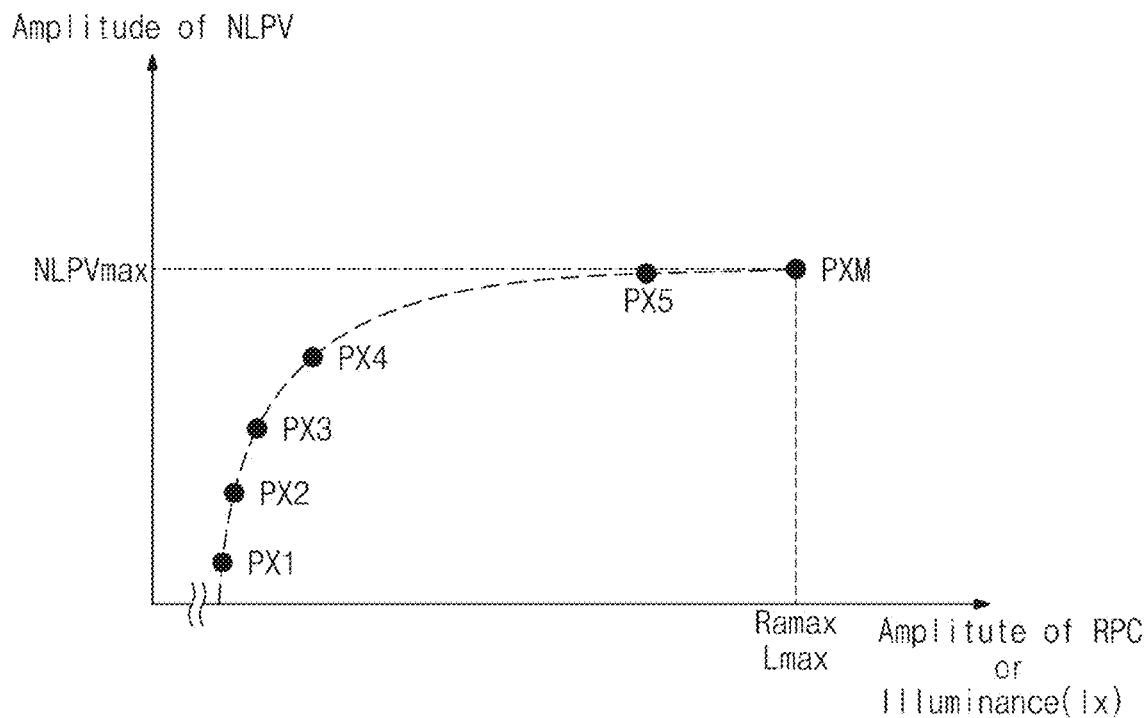
FIG. 5 is a graph illustrating a relationship between a non-linear pixel value and a raw pixel code amplitude and a relationship between a non-linear pixel value and illuminance of a light incident onto an image pixel.
FIG. 6 is a diagram illustrating an example of a linear pixel value for first to fifth image pixels of FIG. 5.

FIG. 5 is a graph illustrating a relationship between a non-linear pixel value and a raw pixel code amplitude, and a relationship between a non-linear pixel value and illuminance of a light incident onto an image pixel.

Referring to FIGS. 1 to 3 and 5, the non-linear mapping unit 111 may non-linearly map the plurality of raw pixel codes RPC to the plurality of non-linear pixel values NLPV. In this case, in each, or one or more, of the first to fifth image pixels PX1 to PX5, the amplitudes of the raw pixel code and the non-linear pixel value may have a non-linear function relationship. In detail, NLPV(k) being the non-linear pixel value of the k-th image pixel may be expressed by $F(AMP_{RPC}(k))$ being the non-linear function of the amplitude of the raw pixel code of the k-th image pixel like Equation 2 below.

$$NLPV(k)=F(AMP_{RPC}(k)) \qquad \text{[Equation 2]}$$

In some example embodiments, the non-linear mapping unit 111 may map a raw pixel code having the greatest amplitude from among the plurality of raw pixel codes RPC to a relatively great non-linear pixel value. For example, the second image pixel PX2 may correspond to a raw pixel code of a relatively great amplitude compared to the first image pixel PX1. In this case, the second image pixel PX2 may correspond to a relatively great non-linear pixel value compared to the first image pixel PX1.

In some example embodiments, to improve the efficiency of operation of the machine vision device MVD in the low-illuminance environment, when the amplitude of the raw pixel code is small (even though the amplitude of the raw pixel code changes slightly compared to the amplitude of the raw pixel code is great), the non-linear mapping unit 111 may map the plurality of raw pixel codes RPC to the plurality of non-linear pixel values NLPV such that a change in the relatively great non-linear pixel value is great. For example, in this case, even though raw pixel codes of image pixels corresponding to the low-illuminance environment (e.g., receiving the light of low illuminance) are similar in amplitude, a difference between non-linear pixel values corresponding thereto may be great. In contrast, even though an amplitude difference of raw pixel codes of image pixels corresponding to the high-illuminance environment (e.g., receiving the light of high illuminance) is great, non-linear pixel values corresponding thereto may be similar. A difference of non-linear pixel values for each illuminance will be described with reference to FIG. 6.

That is, referring to the first to third image pixels PX1 to PX3, the illuminance of the light incident onto the second image pixel PX2 may be greater than the illuminance of the light incident onto the first image pixel PX1 and may be smaller than the illuminance of the light incident onto the third image pixel PX3.

Also, a ratio that is obtained by dividing a difference between first and second illuminance (which is the illuminance of light incident onto the first and second image pixels PX1 and PX2) by an amplitude difference of first and second raw pixel codes (which is raw pixel codes of the first and second image pixels PX1 and PX2) may be a first ratio. In this case, a ratio that is obtained by dividing a difference between second and third illuminance (which is the illuminance of light incident onto the second and third image pixels PX2 and PX3) by an amplitude difference of second and third raw pixel codes (which is raw pixel codes of the second and third image pixels PX2 and PX3) may be a second ratio, smaller than the first ratio.

That is, in some example embodiments, the non-linear function that is a function of increasing depending on an amplitude change of a raw pixel code may be a convex upward function. In other words, a function value of a first derivative to an amplitude $AMP_{RPC}(k)$ of a raw pixel code of a non-linear function may be 0 or more, and a function value of a second derivative to an amplitude of a raw pixel code of a non-linear function may be 0 or less.

In some example embodiments, the non-linear function $F(AMP_{RPC}(k))$ may be a logarithmic function or an exponential function. Below, for brief description, in particular, when the non-linear function is the logarithmic function, the efficiency of operation of the machine vision device MVD in the low-illuminance environment (e.g., in the case where the machine vision system MVS operates under the illuminance of 1000 lx) may be greatly improved. Below, for brief description, some example embodiments in which the non-linear function is the logarithmic function is assumed. That is, some example embodiments in which a non-linear pixel value NLPV(k) is expressed by Equation 3 below will be described below.

$$NLPV(k)=F(AMP_{RPC}(k))=C3 \times \log_{C4}(AMP_{RPC}(k))+C5 \quad \text{[Equation 3]}$$

In Equation 3 above, k may be an integer of 1 or more, and C3, C4, and C5 may be constants.

Below, for brief description, a non-linear pixel value corresponding to the maximum illuminance pixel PXM may be expressed by a "maximum non-linear pixel value NLPVmax". That is, a non-linear pixel value corresponding to the maximum raw pixel code amplitude RAmax by the non-linear mapping unit 111 may be referred to as the "maximum non-linear pixel value NLPVmax". However, the inventive concepts are not limited to the above expressions/terms.

Meanwhile, each, or one or more, of the plurality of non-linear pixel values NLPV may be non-linear to the illuminance of the light incident onto the corresponding image pixel. That is, each, or one or more, of the plurality of non-linear pixel values NLPV may be a non-linear function relationship with the illuminance of the light incident onto the image pixel. In detail, like Equation 4 below, a non-linear pixel value NLPV(k) of the k-th image pixel may be expressed by a non-linear function $G(LUX_k)$ to the illuminance $LUX_k$ of the light incident onto the k-th image pixel (in some example embodiments, the non-linear function $G(LUX_k)$ may be the logarithmic function).

$$NLPV(k)=G(LUX_k)=C6 \times \log_{C7}(LUX_k)+C8 \quad \text{[Equation 4]}$$

In Equation 4 above, k may be an integer of 1 or more, and C6, C7, and C8 may be constants.

That is, according to some example embodiments of the inventive concepts, a pixel that receives a light of relatively high illuminance may correspond to a relatively great non-linear pixel value. Also, to improve the efficiency of operation of the machine vision device MVD in the low-illuminance environment, a non-linear pixel value in the low-illuminance environment may change relatively greatly, even though the illuminance of the light incident onto the image pixel changes slightly (compared to the high-illuminance environment). For example, even though the illuminance of the light incident onto each, or one or more, of image pixels corresponding to the low-illuminance environment (e.g., receiving a light of low illuminance) is similar, a difference between non-linear pixel values corresponding thereto may be great. In contrast, even though an illuminance difference of image pixels corresponding to the high-illuminance environment (e.g., receiving the light of high illuminance) is great, non-linear pixel values corresponding thereto may be similar. As a result, a function of a non-linear pixel value and illuminance of a light incident onto the corresponding image pixel may be a function of increasing depending on illuminance, in detail, may be a convex upward function. A difference of non-linear pixel values for illuminance will be described with reference to FIG. 6.

FIG. 6 is a diagram illustrating an example of a linear pixel value for of first to fifth image pixels of FIG. 5. Referring to FIGS. 1 to 3, 5, and 6, the illuminance of the light incident onto the first to fifth image pixels PX1 to PX5 may be 100 lx, 200 lx, 1000 lx, 40000 lx, and 80000 lx respectively. In this case, raw pixel codes generated from the first to fifth image pixels PX1 to PX5 and amplitudes of the raw pixel codes are similar to those described with reference to FIG. 4, and thus, additional description will be omitted to avoid redundancy.

In some example embodiments, as described with reference to FIG. 5, the non-linear mapping unit 111 may perform the non-linear mapping operation based on the logarithmic function. For example, the non-linear mapping unit 111 may map the raw pixel codes RPC to the non-linear pixel values NLPV so as to correspond to the relationship described with reference to Equation 4. Below, for brief description, some example embodiments in which C6 is "51.2", C7 is "10", and C8 is "0" will be described. However, the inventive concepts are not limited to the above constant values.

The first to fifth image pixels PX1 to PX5 may respectively correspond to "102.40", "117.81", "153.60", "235.63", and "251.04". That is, the raw pixel code whose amplitude is "1" may correspond to "102.40"; the raw pixel code whose amplitude is "2" may correspond to "117.81"; the raw pixel code whose amplitude is "10" may correspond to "153.60"; the raw pixel code whose amplitude is "409" may correspond to "235.63"; the raw pixel code whose amplitude is "819" may correspond to "251.04".

In some example embodiments, when the non-linear mapping unit 111 maps the raw pixel codes RPC to the non-linear pixel values NLPV based on the logarithmic function, a non-linear pixel value may change greatly in the low-illuminance interval. For example, comparing the amplitudes of the raw pixel codes of the first and second image pixels PX1 and PX2 being image pixels of the low-illuminance environment, when the intensity of light that the second image pixel PX2 receives may be greater than that of the first image pixel RX1 as much as 100 lx, the amplitude of the non-linear pixel value corresponding to the second image pixel PX2 may be greater as much as 15.41 (=117.81−102.40). In contrast, comparing the amplitudes of the raw pixel codes of the fourth and fifth image pixels PX4 and PX5 being image pixels of the high-illuminance environment, nonetheless the intensity of light that the fifth image pixel PX5 receives may be greater than that of the fourth image pixel PX4 as much as 40000 lx, but the amplitude of the non-linear pixel value corresponding to the fifth image pixel PX5 may be greater only as much as 15.41 (=251.04−235.63). That is, to allow the non-linear pixel value to change as much as the same amplitude, a variation in illuminance of the light incident onto the image pixel in the high-illuminance environment may be greater than a variation in illuminance of the light incident onto the image pixel in the low-illuminance environment. That is, the non-linear pixel value may change more sensitively (e.g., with a great amplitude) in the low-illuminance interval.

Accordingly, the machine vision device MVD according to some example embodiments of the inventive concepts may operate to be more sensitive to an illuminance change of light in the low-illuminance interval than an illuminance change of light in the high-illuminance interval. In this case, the inefficient computation of the machine vision system MVS operating in the low-illuminance interval (e.g., an indoor environment) may be minimized, and the efficiency of operation of the machine vision system MVS may be improved greatly. That is, the resolution according to the illuminance change of the machine vision device MVD operating in the indoor environment may be improved.

Figure 7:
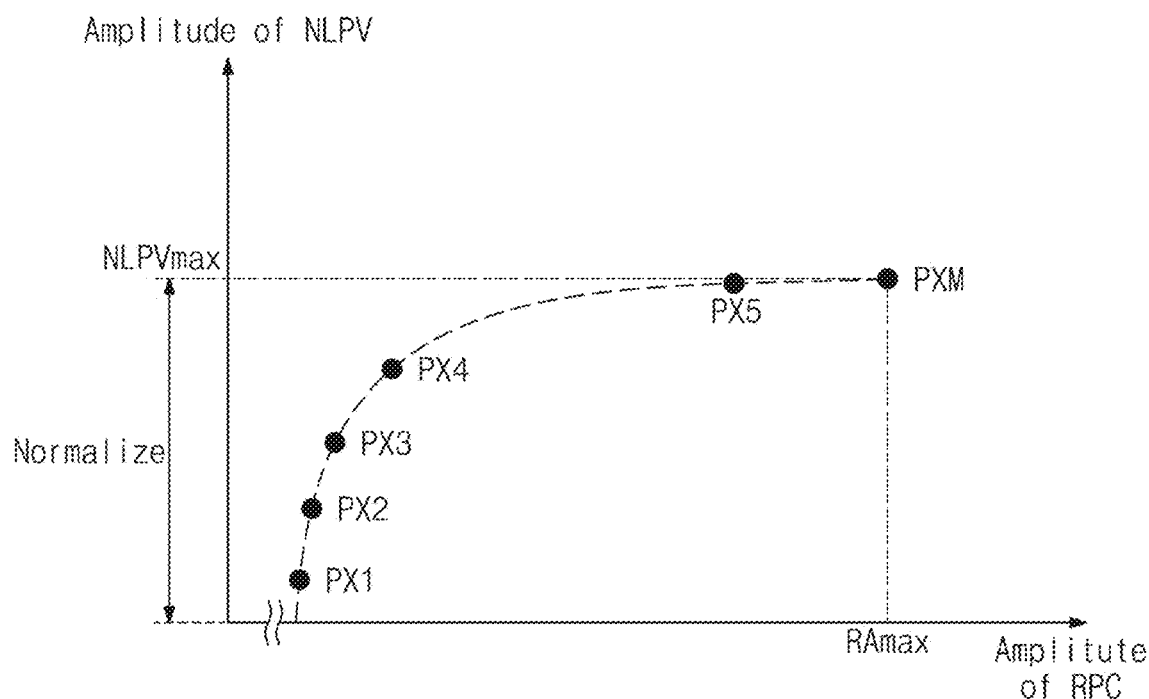
FIG. 7 is a diagram for describing an operation of a quantization unit of FIG. 2.

FIG. 7 is a diagram for describing an operation of a quantization unit of FIG. 2. Referring to FIGS. 2 and 7, the quantization unit 112 may quantize the non-linear pixel values NLPV to generate the non-linear pixel codes NLPC. Below, an operation in which the quantization unit 112 generates the non-linear pixel codes NLPC will be described in detail.

First, the quantization unit 112 may normalize an "interval in which the non-linear pixel values NLPV are capable of being included", based on the code length of the non-linear pixel value. In detail, when the code length of the non-linear pixel code is N-bit, the quantization unit 112 may normalize the interval, in which the non-linear pixel values NLPV are included, into $2^N$ intervals. For example, when the interval in which the non-linear pixel values NLPV are included is from "0" to "5" and the code length of the non-linear pixel value is 2-bit, the quantization unit 112 may normalize the interval from "0" to "5" into 4 ($=2^2$) intervals. In this case, the four intervals may be "0 to 1.25", "1.25 to 2.5", "2.5 to 3.75", and "3.75 to 5". However, the inventive concepts are not limited thereto. For example, the quantization unit 112 may normalize the interval, in which the non-linear pixel values NLPV are included, into ($2^N$−1) intervals. That is, the inventive concepts are not limited to the detailed way to normalize the interval in which the non-linear pixel values NLPV are included.

In some example embodiments, the "interval in which the non-linear pixel values NLPV are capable of being included" may be referred to as an interval between a non-linear pixel value (it is assumed that the non-linear pixel value is "0") corresponding to a raw pixel code where bit values of all bit positions are "0" and a non-linear pixel value (in the inventive concepts, the maximum non-linear pixel value NLPVmax) corresponding to a raw pixel code where bit values of all bit positions are "1".

In some example embodiments, the "period in which the non-linear pixel values NLPV are capable of being included" may be referred to as an interval between a non-linear pixel value corresponding to a raw pixel code having the smallest amplitude from among the plurality of raw pixel codes RPC and a non-linear pixel value corresponding to a raw pixel code having the greatest amplitude from among the plurality of raw pixel codes RPC.

In some example embodiments, the normalized $2^N$ intervals may correspond to the N-bit non-linear pixel code. For example, an interval corresponding to the smallest non-linear pixel value from among the normalized $2^N$ intervals may correspond to a non-linear pixel code in which bit values of all bit positions are "0". In contrast, an interval corresponding to the greatest non-linear pixel value from among the normalized $2^N$ intervals may correspond to a non-linear pixel code (e.g., the full-code) in which bit values of all bit positions are "1". In detail, as described above, when the interval in which non-linear pixel values are included is from "0" to "5" and the code length of the non-linear pixel code is 2-bit, the interval from "0" to "1.25" may correspond to the non-linear pixel code of "$00_{(2)}$", the interval from "1.25" to "2.5" may correspond to the non-linear pixel code of "$01_{(2)}$", the interval from "2.5" to "3.75" may correspond to the non-linear pixel code of "$10_{(2)}$", and the interval from "3.75" to "5" may correspond to the non-linear pixel code of "$11_{(2)}$".

Next, the quantization unit 112 may identify each, or one or more, of the intervals in which the plurality of non-linear pixel values NLPV are included and may generate the non-linear pixel codes NLPC. For example, when a first non-linear pixel value is included in a first interval, the quantization unit 112 may generate a first non-linear pixel code corresponding to the first interval with regard to the first non-linear pixel value. However, the inventive concepts are not limited thereto. For example, the scheme in which the quantization unit 112 determines the non-linear pixel code based on the non-linear pixel value and the interval will be described in detail with reference to FIG. 8.

Figure 8:
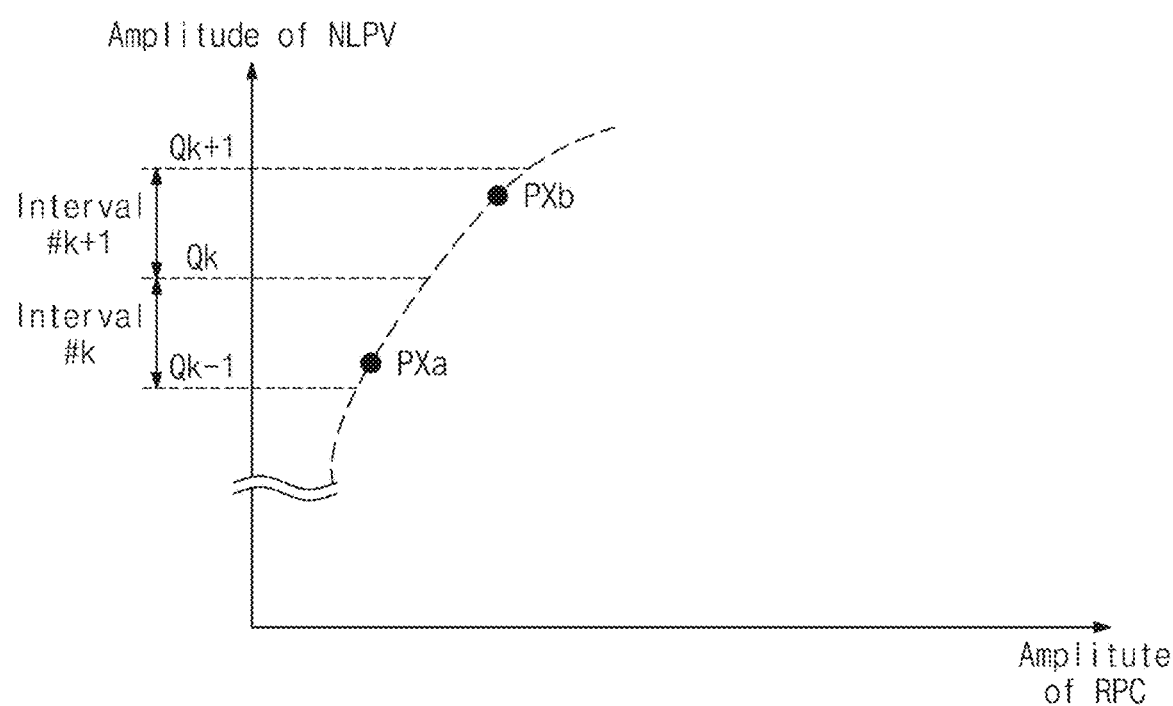
FIG. 8 is a diagram for describing an operation of a quantization unit of FIG. 2 in detail.

FIG. 8 is a diagram for describing an operation of a quantization unit of FIG. 2 in detail. Referring to FIGS. 1, 2, 7, and 8, the pixel array 11 may include a first pixel PXa and a second pixel PXb. Each of the first pixel PXa and the second pixel PXb may be one of the plurality of image pixels included in the pixel array 11.

As described above, when the code length of the non-linear pixel code is N-bit, the quantization unit 112 may split the interval, in which the non-linear pixel values NLPV are included, into $2^N$ intervals. For example, the quantization unit 112 may split the interval, in which the non-linear pixel values NLPV are included, into ($2^N$–1) quantization values. The ($2^N$–1) quantization values may be respectively referred to as a "first quantization value Q1" to a "($2^N$–1)-th quantization value $Q2^N$–1".

Each, or one or more, of the split $2^N$ intervals may correspond to the N-bit non-linear pixel code. For example, the $2^N$ intervals may be referred to as a "first interval interval #1" to a "$2^N$-th interval interval $#2^N$" in the order from an interval corresponding to the smallest non-linear pixel value to an interval corresponding to the greatest non-linear pixel value. In this case, the first interval may correspond to a non-linear pixel code where bit values of bit positions are "0". In contrast, the $2^N$-th interval may correspond to a non-linear pixel code (e.g., the full-code) in which bit values of all bit positions are "1".

In detail, the non-linear pixel value corresponding to the first pixel PXa may be included between the (k–1)-th quantization value Qk–1 and the k-th quantization value Qk. That is, the non-linear pixel value corresponding to the first pixel PXa may be included in the k-th interval interval #k. In this case, the non-linear pixel code corresponding to the first pixel PXa may be referred to as a "first non-linear pixel code".

The non-linear pixel value corresponding to the second pixel PXb may be included between the k-th quantization value Qk and the (k+1)-th quantization value Qk+1. That is, the non-linear pixel value corresponding to the second pixel PXb may be included in the (k+1)-th interval interval #k+1. In this case, the non-linear pixel code corresponding to the second pixel PXb may be referred to as a "second non-linear pixel code".

In this case, the amplitude of the second non-linear pixel code may be greater than the amplitude of the first non-linear pixel code as much as "1". That is, a non-linear pixel code corresponding to the (k+1)-th interval interval #k+1 may be greater than that corresponding to the k-th interval interval #k as much as "1". For example, when the first non-linear pixel code is "$1011_{(2)}$", the second non-linear pixel code may be "$1100_{(2)}$"; when the first non-linear pixel code is "$0110_{(2)}$", the second non-linear pixel code may be "$0111_{(2)}$". However, the inventive concepts are not limited to the above code length of the non-linear pixel code.

Figures 9, 10:
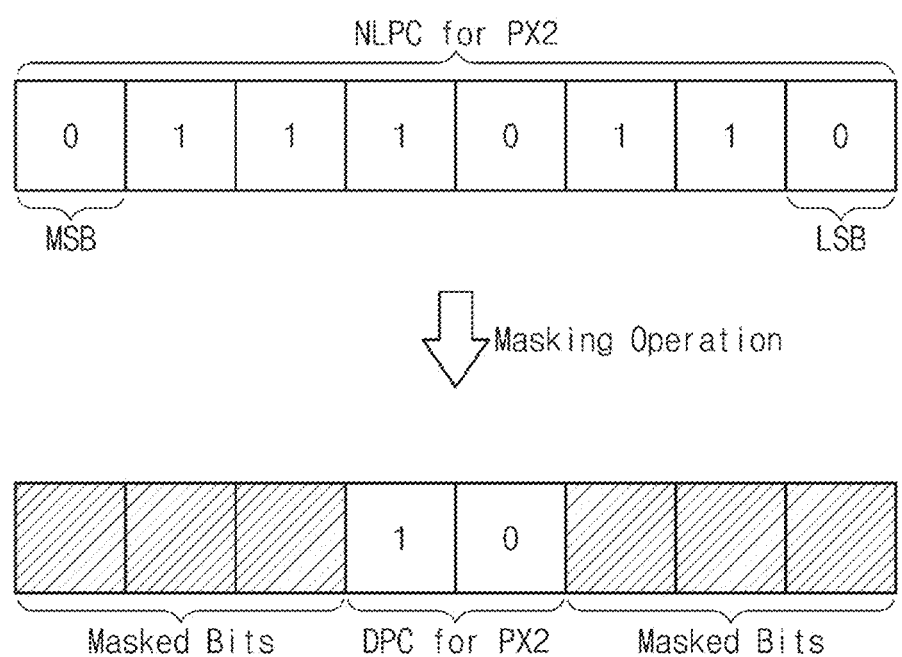
FIG. 9 is a diagram illustrating an example of a non-linear pixel code for first to fifth image pixels of FIG. 7.
FIG. 10 is a diagram for describing an operation of a masking unit of FIG. 1.

FIG. 9 is a diagram illustrating an example of a non-linear pixel code for first to fifth image pixels of FIG. 7. Referring to FIGS. 1, 2, 6, 7, and 9, the illuminance of the light incident onto the first to fifth image pixels PX1 to PX5 may be 100 lx, 200 lx, 1000 lx, 40000 lx, and 80000 lx respectively. In this case, raw pixel codes generated from the first to fifth image pixels PX1 to PX5 and non-linear pixel values corresponding thereto are similar to those described with reference to FIG. 6, and thus, additional description will be omitted to avoid redundancy.

In some example embodiments, as described with reference to FIGS. 2, 7, and 8, the quantization unit 112 may normalize the interval in which the non-linear pixel values NLPV are included, based on the code length of the non-linear pixel code.

For example, the quantization unit 112 may normalize an interval from "0" to "256" being the interval in which the non-linear pixel values NLPV are included, based on 8-bit being the code length of the non-linear pixel code. That is, the quantization unit 112 may split the interval from "0" to "256" into 256 (e.g., $2^8$) intervals. In this case, the 256 intervals may be respectively referred to as a "1st interval" to a "256-th interval" in the order from an interval corresponding to a small non-linear pixel value to an interval corresponding to a great non-linear pixel value. For example, an interval corresponding to a non-linear pixel value from "0" to "1" may be referred to as a "1-st interval", and an interval corresponding to a non-linear pixel value from "255" to "256" may be referred to as a "256-th interval".

Each, or one or more, of the 1st to 256th intervals may correspond to the 8-bit non-linear pixel code. For example, the k-th interval may correspond to a non-linear pixel code being an 8-bit binary number whose magnitude is "k". In detail, the fourth interval may correspond to binary number "$00000100_{(2)}$," (e.g., an 8-bit binary number whose magnitude is "4").

Continuing to referring to FIG. 9, in this way, "102.40" being a non-linear pixel value corresponding to the first image pixel PX1 may be included in the 103-th interval; "117.81" being a non-linear pixel value corresponding to the second image pixel PX2 may be included in the 118-th interval; "153.60" being a non-linear pixel value corresponding to the third image pixel PX3 may be included in the 154-th interval; "235.63" being a non-linear pixel value corresponding to the fourth image pixel PX4 may be included in the 236-th interval; "251.04" being a non-linear pixel value corresponding to the fifth image pixel PX5 may be included in the 252-nd interval.

The quantization unit 112 may identify intervals in which the non-linear pixel values of the first to fifth image pixels PX1 to PX5 are respectively included and may generate the non-linear pixel codes respectively corresponding to the identified intervals. For example, the quantization unit 112 may generate "$01100111_{(2)}$" being the non-linear pixel code of the first image pixel PX1, may generate "$01110110_{(2)}$" being the non-linear pixel code of the second image pixel PX2, may generate "$10011010_{(2)}$" being the non-linear pixel code of the third image pixel PX3, may generate "$11101100_{(2)}$" being the non-linear pixel code of the fourth image pixel PX4, and may generate "$1111100_{(2)}$" being the non-linear pixel code of the fifth image pixel PX5.

FIG. 10 is a diagram for describing an operation of a masking unit of FIG. 1. Referring to FIGS. 1, 9, and 10, the masking unit 120 may generate the plurality of downsized pixel codes DPC by masking a specific bit position(s) of the non-linear pixel codes NLPC. That is, the masking unit 120 may mask bits of the same bit positions for each, or one or more, of the plurality of non-linear pixel code NLPC. Below, for brief description, a masking operation for the non-linear pixel code corresponding to the second image pixel PX2 of FIG. 9 will be described.

Continuing to refer to FIG. 10, the non-linear pixel code of the second image pixel PX2 may be "$01110110_{(2)}$". In this case, a bit (e.g., "0" of a $2^7$ place value) corresponding to the highest place value may be referred to as a "most significant bit MSB". A bit (e.g., "0" of a $2^0$ place value) corresponding to the lowest place value may be referred to as a "least significant bit LSB".

In some example embodiments, "n-most significant bits" may refer to a total of n bits including the most significant bit MSB and being continuous thereof. For example, three most significant bits among "$01110110_{(2)}$" may include "0", "1", and "1".

In some example embodiments, "n-least significant bits" may refer to a total of n bits including the least significant bit LSB and being continuous thereof. For example, four least significant bits among "$01110110_{(2)}$" may include "0" being the least significant bit LSB and three bits continuous to the least significant bit LSB, that is, "0", "1", "1", and "0".

The masking unit 120 may mask an arbitrary bit position under control of the control unit 130. For example, the masking unit 120 may mask three most significant bits and three least significant bits among "01110110$_{(2)}$" being the non-linear pixel code of the second image pixel PX2. In this case, each of the three most significant bits and the three least significant bits may be referred to as a "masked bit". In contrast, "1" and "0" that are not masked may constitute the downsized pixel code of the second image pixel PX2. That is, the downsized pixel code of the second image pixel PX2 may be "10$_{(2)}$". However the inventive concepts are not limited to the masked bit positions described above. That is, depending on the function of the machine vision system MVS, the control unit 130 may control the masking unit 120 such that an arbitrary bit position of the non-linear pixel code is masked.

In some example embodiments, the masking unit 120 may mask the least significant bit LSB that is relatively vulnerable to a noise and causes an increase in computation burden of the machine vision device MVD. However, the inventive concepts are not limited thereto.

In some example embodiments, the masking unit 120 may mask the most significant bit MSB whose value changes with a relatively low frequency. In this case, the computation of the machine vision device MVD may decrease. However, the inventive concepts are not limited thereto.

In some example embodiments, bit positions that are not masked by the masking unit 120 may be continuous. That is, bit positions of the non-linear pixel code, which are not masked, may be adjacent to each other. However, the inventive concepts are not limited thereto.

In some example embodiments, the masking unit 120 may mask bit positions, the number of which varies depending on the function of the machine vision system MVS. That is, the code length of the downsized pixel code DPC (e.g., a value obtained by subtracting the number of masked bit positions from the code length of the non-linear pixel code) may be determined depending on the function of the machine vision system MVS. The code length of the downsized pixel code DPC that is determined depending on the function of the machine vision system MVS is described with reference to FIGS. 1 and 2, and thus, additional description will be omitted to avoid redundancy.

Figures 11, 12:
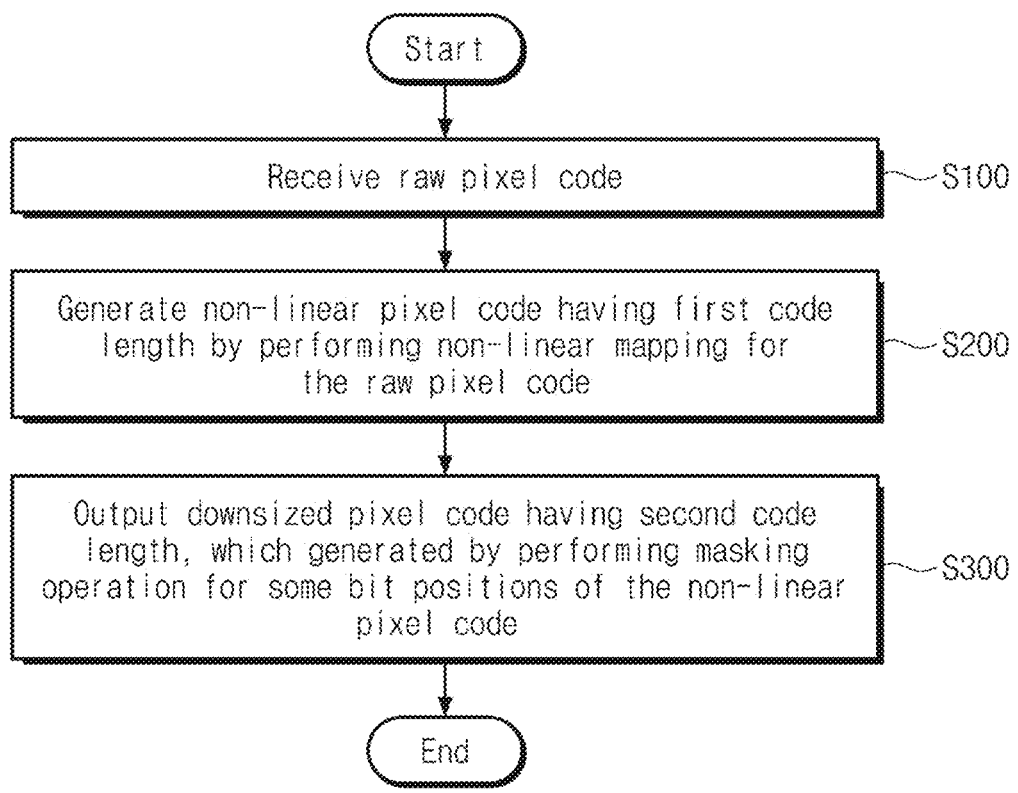
FIG. 11 is a diagram for describing an operation in which a machine vision device detects an event based on a downsized pixel code of FIG. 1, according to some example embodiments of the inventive concepts.
FIG. 12 is a diagram illustrating an operation method of an image signal processing device of FIG. 1.

FIG. 11 is a diagram for describing an operation in which a machine vision device detects an event based on a downsized pixel code of FIG. 1, according to some example embodiments of the inventive concepts. The machine vision device MVD may detect an event based on a variation of the downsized pixel code DPC.

In some example embodiments, the event detected by the machine vision device MVD may be a movement of an object or a change of an object. In detail, the event may be detected based on a variation of the downsized pixel code DPC for each, or one or more, of image pixels corresponding to an edge of an object.

In some example embodiments, the event may refer to the case where illuminance of a light incident onto a specific image pixel changes as much as 10% to 30%. However, the inventive concepts are not limited thereto.

Based on an amplitude variation of a downsized pixel code associated with each, or one or more, image pixel, the machine vision device MVD may determine whether an event occurs, at different times for the respective image pixels.

For example, at a first time T1, the downsized pixel codes DPC of the first to fifth image pixels PX1 to PX5 may respectively be "11$_{(2)}$", "10$_{(2)}$", "10$_{(2)}$", "00$_{(2)}$", and "00$_{(2)}$".

At a second time T2, the downsized pixel codes DPC of the first to fifth image pixels PX1 to PX5 may respectively be "01$_{(2)}$", "01$_{(2)}$", "10$_{(2)}$", "01$_{(2)}$", and "10$_{(2)}$".

In this case, the machine vision device MVD may identify an amplitude variation |ΔDPC| of the downsized pixel code of each, or one or more, image pixel at each, or one or more, of the first time T1 and the second time T2. For example, the machine vision device MVD may determine that the variation of the first image pixel PX1 is "2" (e.g., |11$_{(2)}$−01$_{(2)}$|), may determine that the variation of the second image pixel PX2 is "1" (e.g., |10$_{(2)}$−01$_{(2)}$|), may determine that the variation of the third image pixel PX3 is "0" (e.g., |10$_{(2)}$−10$_{(2)}$|), may determine that the variation of the fourth image pixel PX4 is "1" (e.g., |00$_{(2)}$−01$_{(2)}$|), and may determine that the variation of the fifth image pixel PX5 is "2" (e.g., |00$_{(2)}$−10$_{(2)}$|).

Between the first time T1 and the second time T2, the machine vision device MVD may determine that an image pixel identified as the variation of the corresponding downsized pixel code is a threshold value or more is an image pixel where the "event occurs". For example, when the threshold value is "2", the machine vision device MVD may determine that the first image pixel PX1 and the fifth image pixel PX5 in which the amplitude variation |ΔDPC| of the downsized pixel code is "2" or more are image pixels where the event occurs. In contrast, the machine vision device MVD may determine that the second to fourth image pixels PX2 to PX4 in which the amplitude variation |ΔDPC| of the downsized pixel code is smaller than "2" are image pixels where the event does not occur. However the inventive concepts are not limited to the code length of the downsized pixel code and/or the threshold value described above.

FIG. 12 is a diagram illustrating an operation method of an image signal processing device of FIG. 1. Referring to FIGS. 1 and 12, in operation S100, the image signal processing device 100 may receive the raw pixel code RPC from the image sensor device 10. In this case, an amplitude of a raw pixel code may be determined to be linear to illuminance of a light incident onto an image pixel.

In some example embodiments, the code length of the raw pixel code RPC may be 8-bit or 10-bit.

In operation S200, the image signal processing device 100 may perform non-linear mapping on the received raw pixel code RPC to generate the non-linear pixel code NLPC having a first code length. For example, the non-linearizing unit 110 may generate the plurality of non-linear pixel codes NLPC having the first code length, based on the plurality of raw pixel codes RPC. In this case, an amplitude of each, or one or more, of the non-linear pixel codes NLPC may be non-linear to illuminance of a light incident onto the corresponding image pixel. Operation S200 will be described in detail with reference to FIGS. 13 to 15.

In some example embodiments, the first code length may be 4-bit or more and 8-bit or less.

In operation S300, the image signal processing device 100 may generate the downsized pixel code DPC having a second code length by masking some of bit positions of the non-linear pixel code NLPC. For example, the masking unit 120 may mask some of bit positions of each, or one or more, of the non-linear pixel codes NLPC. In each, or one or more, of the non-linear pixel codes NLPC, the masking unit 120 may determine bits of unmasked bit positions as the downsized pixel code DPC.

In some example embodiments, the second code length may be 1-bit or more and 4-bit or less.

Figure 13:
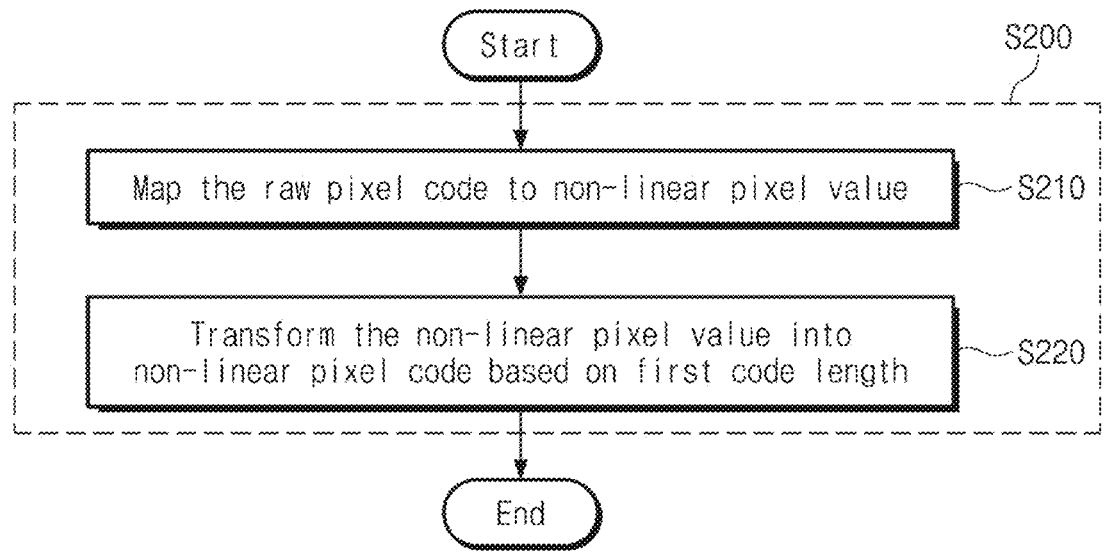
FIG. 13 is a diagram illustrating operation S200 of FIG. 12 in detail.

FIG. 13 is a diagram illustrating operation S200 of FIG. 12 in detail. Referring to FIGS. 1, 2, 12, and 13, operation S200 may include operation S210 and operation S220. In operation S210, the image signal processing device 100 may map the raw pixel code RPC to the non-linear pixel value NLPV. For example, the non-linear mapping unit 111 may map the raw pixel codes RPC to the non-linear pixel values NLPV. In this case, the amplitudes of the raw pixel codes RPC and the non-linear pixel values NLPV may have the non-linear function relationship. Operation S210 will be described in detail with reference to FIGS. 14.

In some example embodiments, the non-linear pixel values NLPV and the amplitudes of the raw pixel codes RPC may have the logarithmic function relationship. As such, each, or one or more, of the of non-linear pixel values NLPV may have the logarithmic function relationship with the illuminance of the light incident onto the corresponding image pixel.

In operation S220, the image signal processing device 100 may convert the non-linear pixel value NLPV into the non-linear pixel code NLPC based on the first code length. For example, the quantization unit 112 may quantize the non-linear pixel values NLPV to generate the non-linear pixel codes NLPC. Operation S220 will be described in detail with reference to FIGS. 15.

Figure 14:
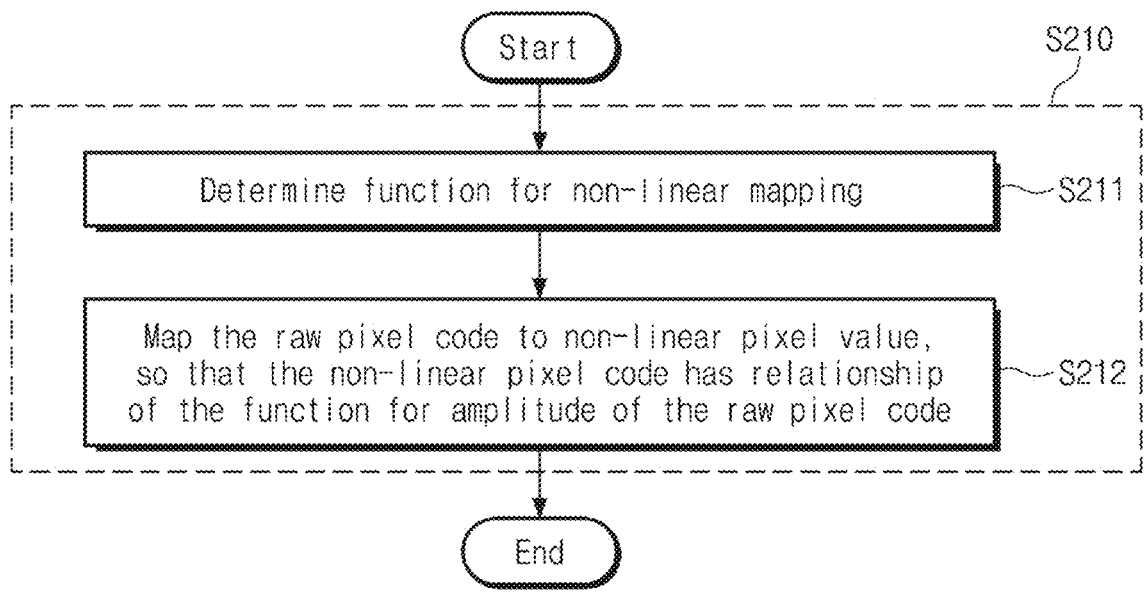
FIG. 14 is a diagram illustrating operation S210 of FIG. 13 in detail.

FIG. 14 is a diagram illustrating operation S210 of FIG. 13 in detail. Referring to FIGS. 1, 2, 12, and 14, operation S210 may include operation S211 and operation S212. In operation S211, the image signal processing device 100 may determine a function for non-linear mapping. For example, the non-linear mapping unit 111 may determine a function relationship between the amplitudes of the raw pixel codes RPC and the non-linear pixel values NLPV under control of the control unit 130.

In operation S212, the image signal processing device 100 may map the raw pixel code RPC to the non-linear pixel value such that the non-linear pixel code and the amplitude of the raw pixel code have the function relationship determined in operation S211. For example, the non-linear mapping unit 111 may allow the non-linear pixel values NLPV and the amplitudes of the raw pixel codes RPC to have the function relationship determined in operation S211.

In some example embodiments, the function relationship determined in operation S211 may be the logarithmic function.

Figure 15:
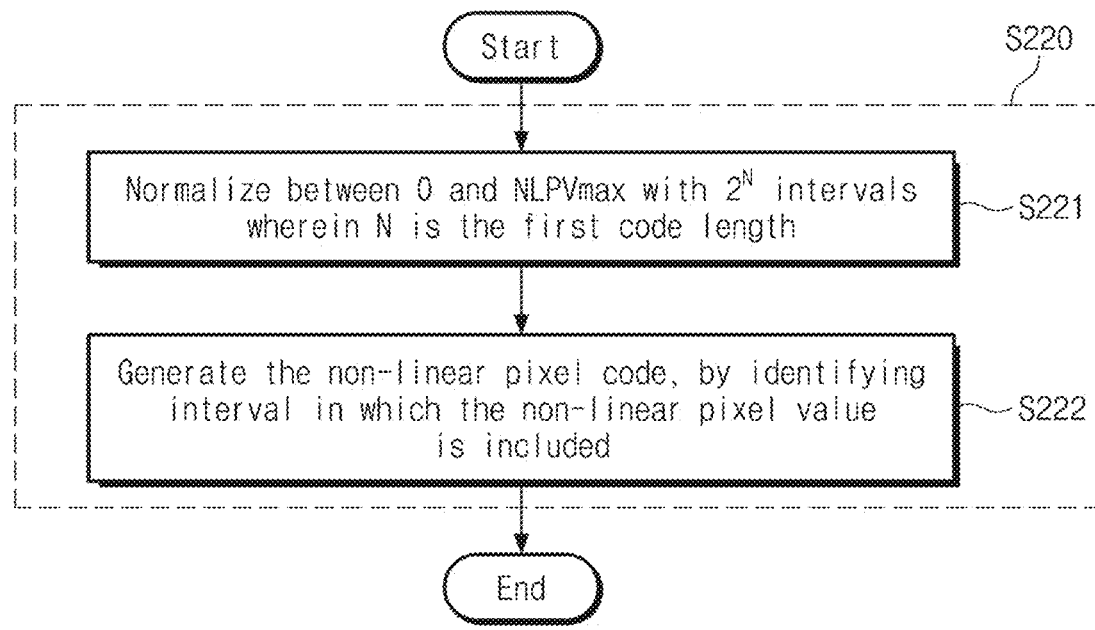
FIG. 15 is a diagram illustrating operation S220 of FIG. 13 in detail.

FIG. 15 is a diagram illustrating operation S220 of FIG. 13 in detail. Referring to FIGS. 1, 2, 12, and 15, operation S220 may include operation S221 and operation S222. In operation S221, the image signal processing device 100 may normalize an interval, in which non-linear pixel values are included, into a plurality of intervals. For example, when the code length (e.g., the first code length) of the non-linear pixel code is N-bit, the quantization unit 112 may split the interval, in which the non-linear pixel values NLPV are included, into 2 N intervals. In this case, the interval in which the non-linear pixel values NLPV are included may refer to an interval between "0" and the maximum non-linear pixel value NLPVmax. However, the inventive concepts are not limited thereto. For example, the interval in which the non-linear pixel values NLPV are included may refer to an interval between a non-linear pixel value corresponding to a raw pixel code where bit values of all bit positions are "0" and a non-linear pixel value corresponding to a raw pixel code being a full-code. Alternatively, the "interval in which the non-linear pixel values NLPV are included" may refer to an interval between a non-linear pixel value corresponding to a raw pixel code having the smallest amplitude from among the plurality of raw pixel codes RPC and a non-linear pixel value corresponding to a raw pixel code having the greatest amplitude from among the plurality of raw pixel codes RPC.

In some example embodiments, each, or one or more, of the $2^N$ intervals may correspond to the N-bit non-linear pixel code. A correspondence relationship between each, or one or more, of the $2^N$ intervals and the N-bit non-linear pixel code is described with reference to FIG. 8, and thus, additional description will be omitted to avoid redundancy.

In operation S222, the image signal processing device 100 may identify the interval in which the non-linear pixel value NLPV is included and may generate the non-linear pixel code NLPC. For example, the quantization unit 112 may identify the interval in which each, or one or more, non-linear pixel value NLPV is included. The quantization unit 112 may generate the non-linear pixel code NLPC based on the interval identified for each, or one or more, non-linear pixel value NLPV.

Figure 16:
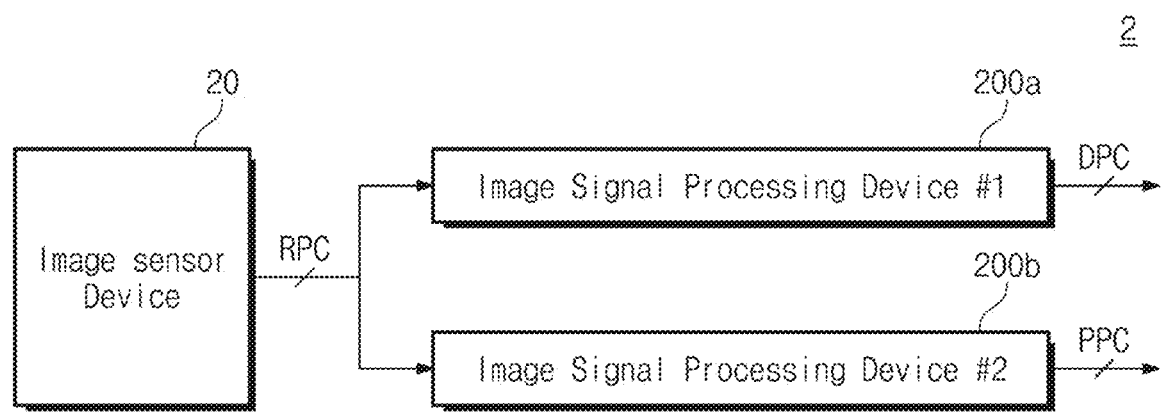
FIG. 16 is a diagram illustrating an image system according to some example embodiments of the inventive concepts.

FIG. 16 is a diagram illustrating an image system according to some example embodiments of the inventive concepts. Referring to FIGS. 1 and 16, an image system 2 may include an image sensor device 20, a first image signal processing device 200a, and/or a second image signal processing device 200b.

The image sensor device 20 may include a plurality of image pixels. The image sensor device 20 may generate the raw pixel code RPC based on illuminance of a light incident from the outside, for each, or one or more, image pixel.

In some example embodiments, a configuration and an operation of the image sensor device 20 may be similar to the configuration and the operation of the image sensor device 10 described with reference to FIG. 1. Accordingly, for brief description, additional description associated with the image sensor device 20 and the raw pixel code RPC will be omitted to avoid redundancy.

Each, or one or more, of the first and second image signal processing devices 200a and/or 200b may receive the raw pixel codes RPC. The first and second image signal processing devices 200a and 200b may perform a signal processing operation on the raw pixel codes RPC in different schemes. For example, the first image signal processing device 200a may perform the signal processing operation necessary, or sufficient, for a machine vision function. In contrast, the second image signal processing device 200b may perform the signal processing operation for converting the raw pixel codes RPC into image data similar to that viewable by human eyes.

The first image signal processing device 200a may perform the signal processing operation on the raw pixel codes RPC and may output the downsized pixel codes DPC. For example, as in the above description given with reference to FIGS. 1 to 15, the first image signal processing device 200a may generate the downsized pixel codes DPC based on the raw pixel codes RPC. In some example embodiments, the downsized pixel codes DPC may be used by a machine vision device.

The second image signal processing device 200b may perform the signal processing operation on the raw pixel codes RPC and may output processed pixel codes PPC. For example, the second image signal processing device 200b may generate the processed pixel codes PPC by performing one or more of various kinds of signal processing operations: noise reducing, white balancing, demosaicing, sharpening, color transforming, and/or gamma correction. In some example embodiments, the processed pixel codes PPC may form an image that is similar to that visually perceivable by the human.

That is, according to some example embodiments of the inventive concepts, the raw pixel codes RPC generated from the image sensor device 20 may be transferred to different image signal processing devices depending on a corresponding purpose (e.g., function). However, the inventive concepts are not limited thereto.

Figure 17:
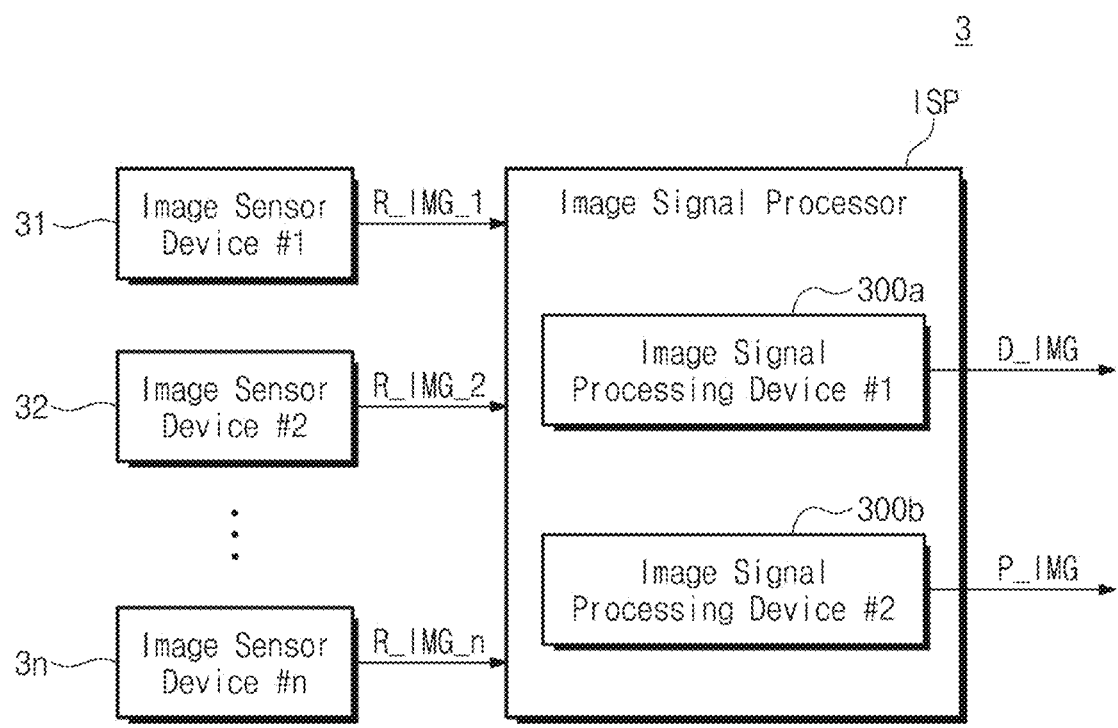
FIG. 17 is a diagram illustrating an image system according to some example embodiments of the inventive concepts.

FIG. 17 is a diagram illustrating an image system according to some example embodiments of the inventive concepts. Referring to FIGS. 1, 16, and 17, an image system 3 may include first to n-th image sensor devices 31 to 3*n* and an image signal processor ISP.

The first to n-th image sensor devices 31 to 3*n* may respectively output first to n-th raw images R_IMG_1 to R_IMG_n. The first to n-th image sensor devices 31 to 3*n* may have different physical characteristics. For example, the first to n-th image sensor devices 31 to 3*n* may have different focal distances. In detail, the first image sensor device 31 may include a normal lens (e.g., a lens for providing an image naturally perceivable by the human), the second image sensor device 32 may include a wide angle lens, the third image sensor device 33 may include an ultra-wide angle lens, and/or the fourth image sensor device 34 may include a telephoto lens. However, the inventive concepts are not limited thereto.

As such, the first to n-th raw images R_IMG_1 to R_IMG_n may have different characteristics. That is, the first to n-th raw images R_IMG_1 to R_IMG_n may be images photographed through lenses of different focal distances. However, the inventive concepts are not limited thereto. For example, the first to n-th raw images R_IMG_1 to R_IMG_n may be images photographed with different exposure times and/or may be images having different resolutions.

In some example embodiments, each, or one or more, of the first to n-th raw images R_IMG_1 to R_IMG_n may include the plurality of raw pixel codes RPC described with reference to FIGS. 1 to 15.

The image signal processor ISP may perform the signal processing operation and/or the image processing operation on the first to n-th raw images R_IMG_1 to R_IMG_n. For example, the image signal processor ISP may include a first image signal processing device 300*a* and/or a second image signal processing device 300*b*. The first and/or second image signal processing devices 300*a* and/or 300*b* may perform the signal processing operation on the raw image in different schemes.

The first image signal processing device 300*a* may perform the signal processing operation necessary, or sufficient, for a machine vision function. For example, as in the above description given with reference to FIGS. 1 to 15, the first image signal processing device 300*a* may generate the downsized pixel codes based on the raw pixel codes included in the raw image.

In some example embodiments, the first image signal processing device 300*a* may downsize one of the first to n-th raw images R_IMG_1 to R_IMG_n. For example, a processor (not illustrated) placed outside the image system 3 may select one (e.g., an image sensor device that the user is using through an application program) of the first to n-th image sensor devices 31 to 3*n* depending on a request of the user. Alternatively, a processor (not illustrated) placed outside the image system 3 may select one of the first to n-th image sensor devices 31 to 3*n* based on an operating environment of the image system 3. In this case, the first image signal processing device 300*a* may output downsized image data D_IMG by downsizing raw image data received from the selected image sensor device. However, the inventive concepts are not limited thereto. For example, the first image signal processing device 300*a* may downsize two or more raw images.

The second image signal processing device 300*b* may perform the signal processing operation or the image processing operation for generating image data similar to that visually perceivable by the human. For example, the second image signal processing device 300*b* may generate a processed image P_IMG by performing the signal processing operation and/or the image processing operation on each, or one or more, of the first to n-th raw images R_IMG_1 to R_IMG_n. A detailed configuration and a detailed operation of the second image signal processing device 300*b* are similar to the configuration and the operation of the second image signal processing device 200*b* described with reference to FIG. 16, and thus, additional description will be omitted to avoid redundancy.

Figure 18:
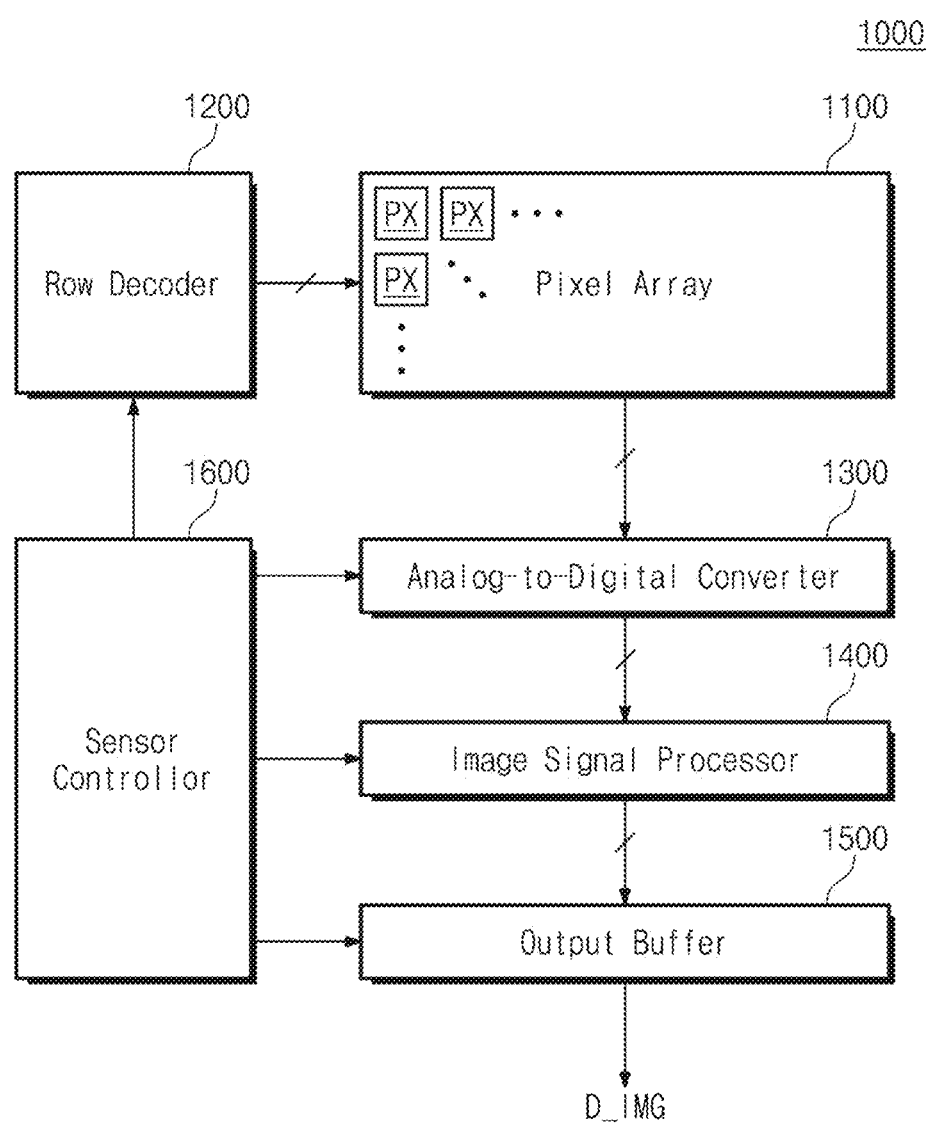
FIG. 18 is a block diagram illustrating an image sensor device according to some example embodiments of the inventive concepts.

FIG. 18 is a block diagram illustrating an image sensor device according to some example embodiments of the inventive concepts. Referring to FIG. 18, an image sensor device 1000 may include a pixel array 1100, a row decoder 1200, an analog-to-digital converter 1300, an image signal processor 1400, an output buffer 1500, and/or a sensor controller 1600.

The pixel array 1100 may include a plurality of image pixels PX. The plurality of image pixels PX may be arranged in the row direction and the column direction to form a matrix structure. The pixel array 1100 and the plurality of image pixels PX are similar to those described with reference to FIG. 1, and thus, additional description will be omitted to avoid redundancy.

In some example embodiments, the pixel array 1100 may be implemented in a semiconductor chip different from that of the remaining components (e.g., the row decoder 1200, the analog-to-digital converter 1300, the image signal processor 1400, and/or the output buffer 1500) of the image sensor device 1000. For example, the pixel array 1100 may be implemented in a first semiconductor chip, and the remaining components of the image sensor device 1000 may be implemented in a second semiconductor chip. In this case, the first semiconductor chip and the second semiconductor chip may be implemented in different wafers, and the first semiconductor chip may be stacked on the second semiconductor chip. However, the inventive concepts are not limited thereto.

The row decoder 1200 may control the plurality of image pixels PX. For example, the row decoder 1200 may generate various control signals (e.g., a shutter signal, a transfer signal, a reset signal, and/or a selection signal) for controlling the plurality of image pixels PX. Each, or one or more, of the plurality of image pixels PX may generate an analog signal (e.g., a voltage) based on a control signal from the row decoder 1200.

In some example embodiments, the row decoder 1200 may control the plurality of image pixels PX in units of row. For example, the row decoder 1200 may provide the same control signal to image pixels arranged in the same row from among the plurality of image pixels PX. However, the inventive concepts are not limited thereto.

The analog-to-digital converter 1300 may convert the analog signal generated by each, or one or more, image pixel PX into a digital signal. For example, the analog-to-digital converter 1300 may generate the digital signal in a correlated double sampling (CDS) scheme. In this case, an amplitude of the generated digital signal may be linear to illuminance of a light incident onto each, or one or more, image pixel.

In some example embodiments, the analog-to-digital converter 1300 may convert analog signals generated from image pixels arranged in the same row from among the plurality of image pixels PX in parallel. The analog-to-digital converter 1300 may sequentially convert analog signals generated from image pixels arranged in the same column from among the plurality of image pixels PX.

In some example embodiments, the pixel array 1100 may be implemented with a digital pixel array including a plurality of digital image pixels. In this case, the analog-to-digital converter 1300 may be omitted. For example, each, or one or more, of the digital image pixels may generate the digital signal and may provide the digital signal directly to the image signal processor 1400.

In some example embodiments, when the pixel array 1100 includes a plurality of digital image pixels, the image sensor device 1000 may be referred to as a "digital pixel sensor (DPS) device"

The image signal processor 1400 may receive the digital signals. The image signal processor 1400 may convert the digital signals so as to be appropriate for machine vision. For example, the image signal processor 1400 may be implemented to be similar to the image signal processing device 100 of FIG. 1 in scheme. In this case, the digital signals may correspond to the raw pixel codes RPC of FIG. 1, and the image signal processor 1400 may downsize the digital signals. That is, the image signal processor 1400 may downsize the digital signals to output the downsized pixel codes.

In some example embodiments, the image signal processor 1400 may perform the signal processing operation on digital signals corresponding to image pixels arranged in the same row from among the plurality of image pixels PX in parallel. The image signal processor 1400 may sequentially perform the signal processing operation on digital signals corresponding to image pixels arranged in the same column from among the plurality of image pixels PX.

The output buffer 1500 may buffer and output the downsized pixel codes provided from the image signal processor 1400. That is, the output buffer 1500 may buffer the downsized pixel codes to output the downsized image D_IMG. In this case, the computation of the machine vision device that operates based on the downsized image D_IMG may decrease. As such, power consumption of the machine vision device may decrease, and the operation speed thereof may be improved.

That is, according to some example embodiments of the inventive concepts, the operation of downsizing the image signal may be performed within the image sensor device. In this case, the machine vision device may directly receive the downsized image D_IMG from the image sensor device 1000. Accordingly, the efficiency of operation of the machine vision system may be improved. However, the inventive concepts are not limited thereto. For example, as in the above description given with reference to FIGS. 1 to 15, the operation of downsizing the image signal may be performed outside the image sensor device.

The sensor controller 1600 may control an overall operation of the image sensor device 1000. For example, the sensor controller 1600 may control an operation of at least one or more of the pixel array 1100, the row decoder 1200, the analog-to-digital converter 1300, the image signal processor 1400, and/or the output buffer 1500.

Figure 19:
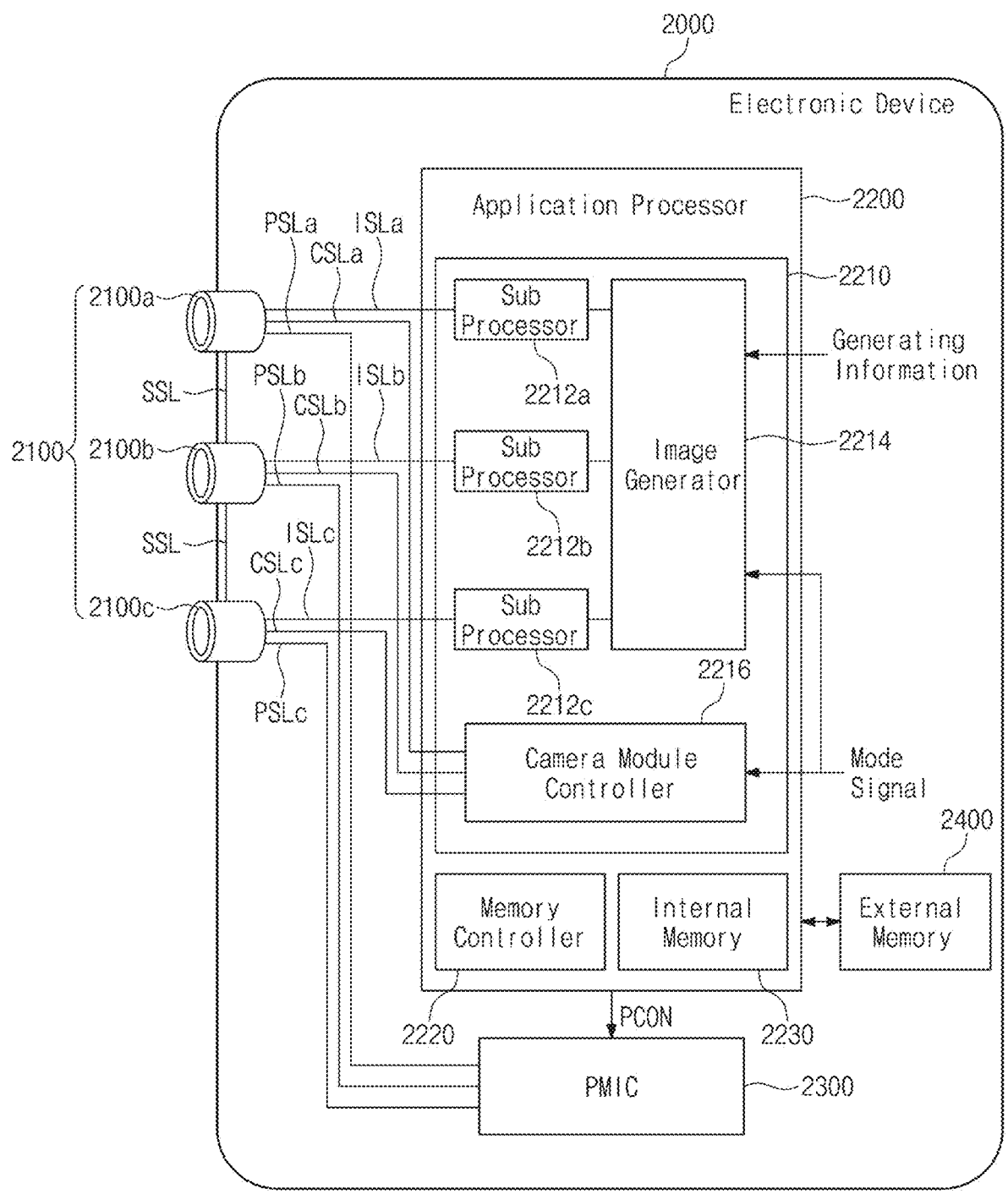
FIG. 19 is a block diagram illustrating a configuration of an electronic device including a multi-camera module according to some example embodiments of the inventive concepts.

FIG. 19 is a block diagram of an electronic device including a multi-camera module. Referring to FIG. 19, an electronic device 2000 may include a camera module group 2100, an application processor 2200, a PMIC 2300, and/or an external memory 2400.

The camera module group 2100 may include a plurality of camera modules 2100a, 2100b, and/or 2100c. An electronic device including three camera modules 2100a, 2100b, and/or 2100c is illustrated in FIG. 19, but the inventive concepts are not limited thereto. In some example embodiments, the camera module group 2100 may be modified to include only two camera modules. Also, in some example embodiments, the camera module group 2100 may be modified to include "n" camera modules (n being a natural number of 4 or more). For example, the camera module group 2100 may include first to n-th camera modules respectively corresponding to the first to n-th image sensor devices 31 and 3n described with reference to FIG. 17. In this case, at least one or more of the first to n-th camera modules may be used to generate image data necessary, or sufficient, to implement the machine vision function of the electronic device 2000.

Figure 20:
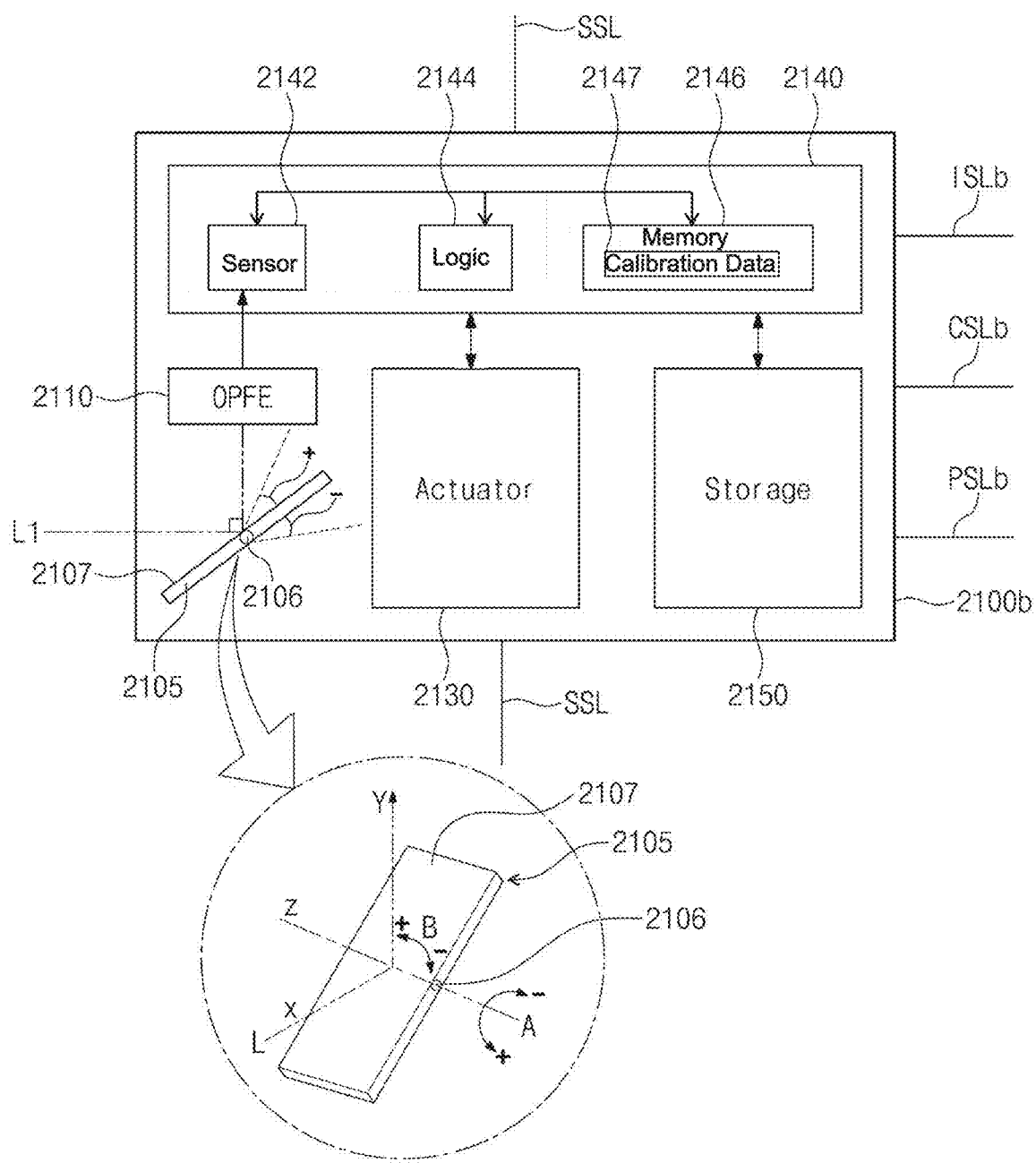
FIG. 20 is a block diagram illustrating a configuration of a camera module of FIG. 19.

FIG. 20 is a block diagram illustrating a camera module of FIG. 19 in detail. Below, a detailed configuration of the camera module 2100b will be more fully described with reference to FIG. 20, but the following description may be equally applied to the remaining camera modules 2100a and/or 2100c.

Referring to FIG. 20, the camera module 2100b may include a prism 2105, an optical path folding element (OPFE) 2110, an actuator 2130, an image sensing device 2140, and/or storage 2150.

The prism 2105 may include a reflecting plane 2107 of a light reflecting material and may change a path of a light "L" incident from the outside.

In some example embodiments, the prism 2105 may change a path of the light "L" incident in a first direction (X) to a second direction (Y) perpendicular to the first direction (X), Also, the prism 2105 may change the path of the light "L" incident in the first direction (X) to the second direction (Y) perpendicular to the first (X-axis) direction by rotating the reflecting plane 2107 of the light reflecting material in direction "A" about a central axis 2106 or rotating the central axis 2106 in direction "B". In this case, the OPFE 2110 may move in a third direction (Z) perpendicular to the first direction (X) and the second direction (Y).

In some example embodiments, as illustrated in FIG. 20, a maximum rotation angle of the prism 2105 in direction "A" may be equal to or smaller than 15 degrees in a positive A direction and may be greater than 15 degrees in a negative A direction, but the inventive concepts are not limited thereto.

In some example embodiments, the prism 2105 may move within approximately 20 degrees in a positive or negative B direction, between 10 degrees and 20 degrees, or between 15 degrees and 20 degrees; here, the prism 2105 may move at the same angle in the positive or negative B direction or may move at a similar angle within approximately 1 degree.

In some example embodiments, the prism 2105 may move the reflecting plane 2107 of the light reflecting material in the third direction (e.g., Z direction) parallel to a direction in which the central axis 2106 extends.

The OPFE 2110 may include optical lenses composed of "m" groups (m being a natural number), for example. Here, "m" lens may move in the second direction (Y) to change an optical zoom ratio of the camera module 2100b. For example, when a default optical zoom ratio of the camera module 2100b is "Z", the optical zoom ratio of the camera module 2100b may be changed to an optical zoom ratio of 3Z or 5Z or more by moving "m" optical lens included in the OPFE 2110.

The actuator 2130 may move the OPFE 2110 or an optical lens (hereinafter referred to as an "optical lens") to a specific location. For example, the actuator 2130 may adjust a location of an optical lens such that an image sensor 2142 is placed at a focal length of the optical lens for accurate sensing.

The image sensing device 2140 may include the image sensor 2142, control logic 2144, and/or a memory 2146. The image sensor 2142 may sense an image of a sensing target by using the light "L" provided through an optical lens. In some example embodiments, a configuration and an operation of the image sensor 2142 may be similar to those of the image sensor device 10 described with reference to FIGS. 1 to 15. The control logic 2144 may control overall operations of the camera module 2100b. For example, the control logic 2144 may control an operation of the camera module 2100b based on a control signal provided through a control signal line CSLb.

The memory 2146 may store information, which is necessary, or sufficient, for an operation of the camera module 2100b, such as calibration data 2147. The calibration data 2147 may include information necessary, or sufficient, for the camera module 2100b to generate image data by using the light "L" provided from the outside. The calibration data 2147 may include, for example, information about the degree of rotation described above, information about a focal length, information about an optical axis, etc. In the case where the camera module 2100b is implemented in the form of a multi-state camera in which a focal length varies depending on a location of an optical lens, the calibration data 2147 may include a focal length value for each, or one or more, location (or state) of the optical lens and/or information about auto focusing.

The storage 2150 may store image data sensed through the image sensor 2142. The storage 2150 may be disposed outside the image sensing device 2140 and may be implemented in a shape where the storage 2150 and a sensor chip constituting the image sensing device 2140 are stacked. In some example embodiments, the storage 2150 may be implemented with an electrically erasable programmable read only memory (EEPROM), but the inventive concepts are not limited thereto.

Referring together to FIGS. 19 and 20, in some example embodiments, each, or one or more, of the plurality of camera modules 2100a, 2100b, and/or 2100c may include the actuator 2130. As such, the same calibration data 2147 or different calibration data 2147 may be included in the plurality of camera modules 2100a, 2100b, and/or 2100c depending on operations of the actuators 2130 therein.

In some example embodiments, one camera module (e.g., 2100b) among the plurality of camera modules 2100a, 2100b, and/or 2100c may be a folded lens shape of camera module in which the prism 2105 and the OPFE 2110 described above are included, and the remaining camera modules (e.g., 2100a and/or 2100c) may be a vertical shape of camera module in which the prism 2105 and the OPFE 2110 described above are not included; however, the inventive concepts are not limited thereto.

In some example embodiments, one camera module (e.g., 2100c) among the plurality of camera modules 2100a, 2100b, and/or 2100c may be, for example, a vertical shape of depth camera extracting depth information by using an infrared ray (IR). In this case, the application processor 2200 may merge image data provided from the depth camera and image data provided from any other camera module (e.g., 2100a and/or 2100b) and may generate a three-dimensional (3D) depth image.

In some example embodiments, at least two camera modules (e.g., 2100a and 2100b) among the plurality of camera modules 2100a, 2100b, and/or 2100c may have different fields of view. In this case, the at least two camera modules (e.g., 2100a and 2100b) among the plurality of camera modules 2100a, 2100b, and/or 2100c may include different optical lens, but the inventive concepts are not limited thereto.

Also, in some example embodiments, fields of view of the plurality of camera modules 2100a, 2100b, and/or 2100c may be different. In this case, the plurality of camera modules 2100a, 2100b, and/or 2100c may include different optical lens, but the inventive concepts are not limited thereto.

In some example embodiments, the plurality of camera modules 2100a, 2100b, and/or 2100c may be disposed to be physically separated from each other. That is, the plurality of camera modules 2100a, 2100b, and/or 2100c may not use a sensing area of one image sensor 2142, but the plurality of camera modules 2100a, 2100b, and/or 2100c may include independent image sensors 2142 therein, respectively.

Returning to FIG. 19, the application processor 2200 may include an image processing device 2210, a memory controller 2220, and/or an internal memory 2230. The application processor 2200 may be implemented to be separated from the plurality of camera modules 2100a, 2100b, and/or 2100c. For example, the application processor 2200 and the plurality of camera modules 2100a, 2100b, and/or 2100c may be implemented with separate semiconductor chips.

The image processing device 2210 may include a plurality of sub image processors 2212a, 2212b, and/or 2212c, an image generator 2214, and/or a camera module controller 2216.

The image processing device 2210 may include the plurality of sub image processors 2212a, 2212b, and/or 2212c, the number of which corresponds to the number of the plurality of camera modules 2100a, 2100b, and/or 2100c.

Image data respectively generated from the camera modules 2100a, 2100b, and/or 2100c may be respectively provided to the corresponding sub image processors 2212a, 2212b, and/or 2212c through separated image signal lines ISLa, ISLb, and/or ISLc. For example, the image data generated from the camera module 2100a may be provided to the sub image processor 2212a through the image signal line ISLa, the image data generated from the camera module 2100b may be provided to the sub image processor 2212b through the image signal line ISLb, and/or the image data generated from the camera module 2100c may be provided to the sub image processor 2212c through the image signal line ISLc. This image data transmission may be performed, for example, by using a camera serial interface (CSI) based on the MIPI (Mobile Industry Processor Interface), but the inventive concepts are not limited thereto.

Meanwhile, in some example embodiments, one sub image processor may be disposed to correspond to a plurality of camera modules. For example, the sub image processor 2212a and the sub image processor 2212c may be integrally implemented, not separated from each other as illustrated in FIG. 19; in this case, one of the pieces of image data respectively provided from the camera module 2100a and the camera module 2100c may be selected through a selection element (e.g., a multiplexer), and the selected image data may be provided to the integrated sub image processor.

The image data respectively provided to the sub image processors 2212a, 2212b, and/or 2212c may be provided to the image generator 2214. The image generator 2214 may generate an output image by using the image data respectively provided from the sub image processors 2212a, 2212b, and/or 2212c, depending on image generating information Generating Information or a mode signal.

In some example embodiments, at least one of the sub image processors 2212a, 2212b, and/or 2212c may include the image signal processing device 100 described with reference to FIGS. 1 to 15. For example, one or more of the sub image processors 2212a, 2212b, and/or 2212c may generate downsized image data by downsizing raw image data collected through a camera module(s) corresponding thereto. The downsized image data may be used by the application processor 2200 that performs the machine vision function. In this case, the efficiency of operation of the application processor 2200 may be improved.

In detail, the image generator 2214 may generate the output image by merging at least a portion of the image data respectively generated from the camera modules 2100a, 2100b, and/or 2100c having different fields of view, depending on the image generating information Generating Information or the mode signal. Also, the image generator 2214 may generate the output image by selecting one of the image data respectively generated from the camera modules 2100a, 2100b, and/or 2100c having different fields of view, depending on the image generating information Generating Information or the mode signal.

In some example embodiments, the image generating information Generating Information may include a zoom signal and/or a zoom factor. Also, in some example embodiments, the mode signal may be, for example, a signal based on a mode selected from a user.

In the case where the image generating information Generating Information is the zoom signal (or zoom factor) and the camera modules 2100a, 2100b, and/or 2100c have different visual fields of view, the image generator 2214 may perform different operations depending on a kind of the zoom signal. For example, in the case where the zoom signal is a first signal, the image generator 2214 may merge the image data output from the camera module 2100a and the image data output from the camera module 2100c and may generate the output image by using the merged image signal and the image data output from the camera module 2100b that is not used in the merging operation. In the case where the zoom signal is a second signal different from the first signal, without the image data merging operation, the image generator 2214 may select one of the image data respectively output from the camera modules 2100a, 2100b, and/or 2100c and may output the selected image data as the output image. However, the inventive concepts are not limited thereto, and a way to process image data may be modified without limitation if necessary, or sufficient.

In some example embodiments, the image generator 2214 may generate merged image data having an increased dynamic range by receiving a plurality of image data of different exposure times from at least one of the plurality of sub image processors 2212a, 2212b, and/or 2212c and performing high dynamic range (HDR) processing on the plurality of image data.

The camera module controller 2216 may provide control signals to the camera modules 2100a, 2100b, and/or 2100c, respectively. The control signals generated from the camera module controller 2216 may be respectively provided to the corresponding camera modules 2100a, 2100b, and/or 2100c through control signal lines CSLa, CSLb, and/or CSLc separated from each other.

One of the plurality of camera modules 2100a, 2100b, and/or 2100c may be designated as a master camera (e.g., 2100b) depending on the image generating information Generating Information including a zoom signal or the mode signal, and the remaining camera modules (e.g., 2100a and/or 2100c) may be designated as a slave camera. The above designation information may be included in the control signals, and the control signals including the designation information may be respectively provided to the corresponding camera modules 2100a, 2100b, and/or 2100c through the control signal lines CSLa, CSLb, and/or CSLc separated from each other.

Camera modules operating as a master and a slave may be changed depending on the zoom factor and/or an operating mode signal. For example, in the case where the field of view of the camera module 2100a is wider than the field of view of the camera module 2100b and the zoom factor indicates a low zoom ratio, the camera module 2100b may operate as a master, and the camera module 2100a may operate as a slave. In contrast, in the case where the zoom factor indicates a high zoom ratio, the camera module 2100a may operate as a master, and the camera module 2100b may operate as a slave.

In some example embodiments, the control signal provided from the camera module controller 2216 to each, or one or more, of the camera modules 2100a, 2100b, and/or 2100c may include a sync enable signal. For example, in the case where the camera module 2100b is used as a master camera and the camera modules 2100a and 2100c are used as a slave camera, the camera module controller 2216 may transmit the sync enable signal to the camera module 2100b. The camera module 2100b that is provided with sync enable signal may generate a sync signal based on the provided sync enable signal and may provide the generated sync signal to the camera modules 2100a and 2100c through a sync signal line SSL. The camera module 2100b and the camera modules 2100a and/or 2100c may be synchronized with the sync signal to transmit image data to the application processor 2200.

In some example embodiments, the control signal provided from the camera module controller 2216 to each, or one or more, of the camera modules 2100a, 2100b, and/or 2100c may include mode information according to the mode signal. Based on the mode information, the plurality of camera modules 2100a, 2100b, and/or 2100c may operate in a first operating mode and/or a second operating mode with regard to a sensing speed.

In the first operating mode, the plurality of camera modules 2100a, 2100b, and/or 2100c may generate image signals at a first speed (e.g., may generate image signals of a first frame rate), may encode the image signals at a second speed (e.g., may encode the image signal of a second frame rate higher than the first frame rate), and transmit the encoded image signals to the application processor 2200. In this case, the second speed may be 30 times or less the first speed.

The application processor 2200 may store the received image signals, that is, the encoded image signals in the memory 2230 provided therein or the external memory 2400 placed outside the application processor 2200. Afterwards, the application processor 2200 may read and decode the encoded image signals from the memory 2230 or the external memory 2400 and may display image data generated based on the decoded image signals. For example, the corresponding one among sub image processors 2212a, 2212b, and/or 2212c of the image processing device 2210 may perform decoding and may also perform image processing on the decoded image signal.

In the second operating mode, the plurality of camera modules 2100a, 2100b, and/or 2100c may generate image signals at a third speed (e.g., may generate image signals of a third frame rate lower than the first frame rate) and transmit the image signals to the application processor 2200. The image signals provided to the application processor 2200 may be signals that are not encoded. The application processor 2200 may perform image processing on the received image signals and/or may store the image signals in the memory 2230 and/or the external memory 2400.

The PMIC 2300 may supply powers, for example, power supply voltages to the plurality of camera modules 2100a, 2100b, and/or 2100c, respectively. For example, under control of the application processor 2200, the PMIC 2300 may supply a first power to the camera module 2100a through a power signal line PSLa, may supply a second power to the camera module 2100b through a power signal line PSLb, and/or may supply a third power to the camera module 2100c through a power signal line PSLc.

In response to a power control signal PCON from the application processor 2200, the PMIC 2300 may generate a power corresponding to each, or one or more, of the plurality of camera modules 2100a, 2100b, and/or 2100c and may adjust a level of the power. The power control signal PCON may include a power adjustment signal for each, or one or more, operating mode of the plurality of camera modules 2100a, 2100b, and/or 2100c. For example, the operating mode may include a low-power mode. In this case, the power control signal PCON may include information about a camera module operating in the low-power mode and a set power level. Levels of the powers respectively provided to the plurality of camera modules 2100a, 2100b, and/or 2100c may be identical to each other or may be different from each other. Also, a level of a power may be dynamically changed.

Figure 21:
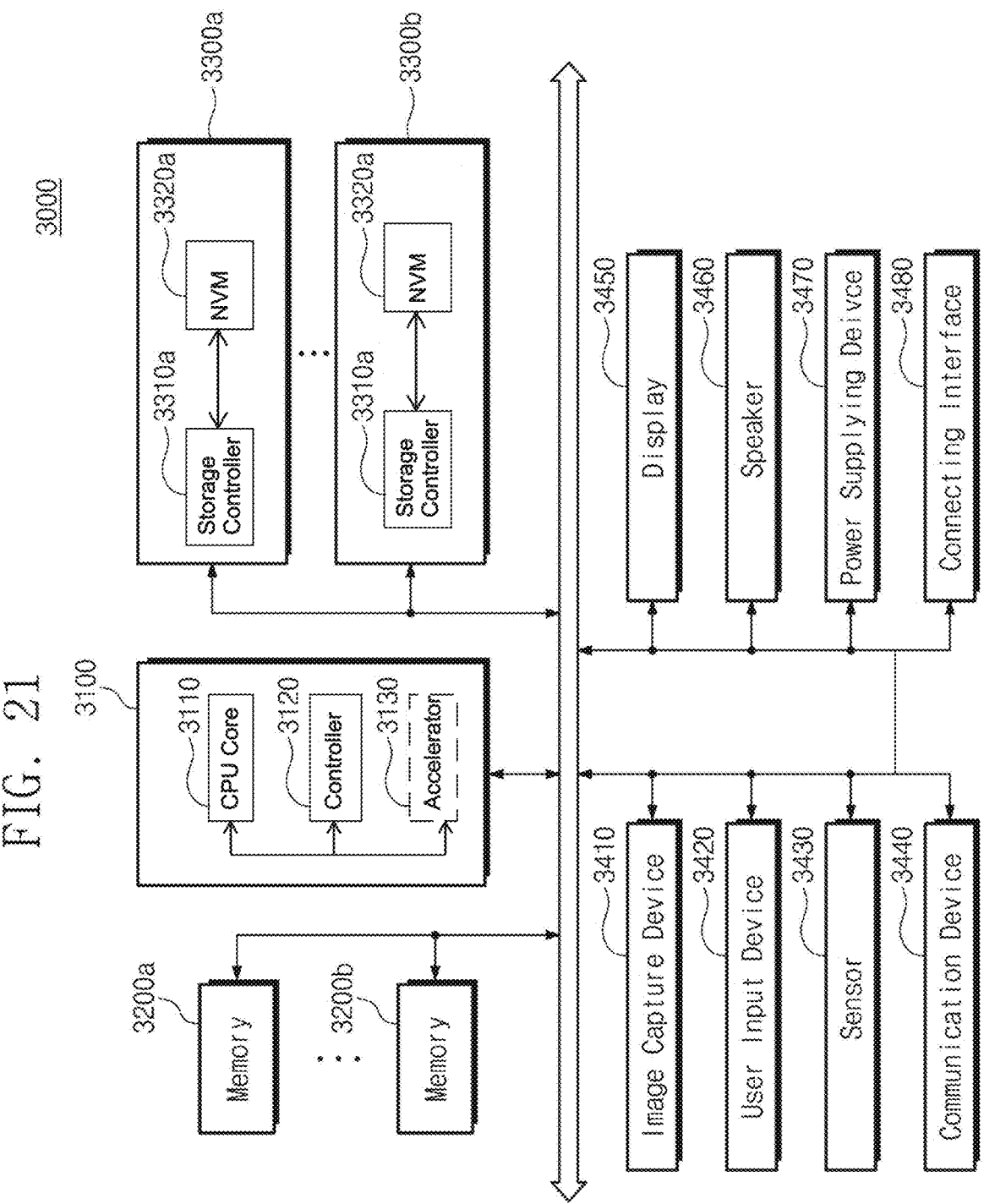
FIG. 21 is a diagram illustrating an electronic system to which a machine vision system according to some example embodiments of the inventive concepts are applied.

FIG. 21 is a diagram of a system 3000 to which a storage device is applied, according to some example embodiments. The system 3000 of FIG. 21 may basically be a mobile system, such as a portable communication terminal (e.g., a mobile phone), a smartphone, a tablet personal computer (PC), a wearable device, a healthcare device, and/or an Internet of things (IOT) device. However, the system 3000 of FIG. 21 is not limited to the mobile system and may be a PC, a laptop computer, a server, a media player, and/or an automotive device (e.g., a navigation device).

Referring to FIG. 21, the system 3000 may include a main processor 3100, memories (e.g., 3200a and/or 3200b), and/or storage devices (e.g., 3300a and/or 3300b). In addition, the system 3000 may include at least one of an image capturing device 3410, a user input device 3420, a sensor 3430, a communication device 3440, a display 3450, a speaker 3460, a power supplying device 3470, and/or a connecting interface 3480.

The main processor 3100 may control all, or one or more, operations of the system 3000, more specifically, operations of other components included in the system 3000. The main processor 3100 may be implemented as a general-purpose processor, a dedicated processor, and/or an application processor.

The main processor 3100 may include at least one CPU core 3110 and further include a controller 3120 configured to control the memories 3200a and/or 3200b and/or the storage devices 3300a and/or 3300b. In some example embodiments, the main processor 3100 may further include an accelerator 3130, which is a dedicated circuit for a high-speed data operation, such as an artificial intelligence (AI) data operation. The accelerator 3130 may include a graphics processing unit (GPU), a neural processing unit (NPU) and/or a data processing unit (DPU) and be implemented as a chip that is physically separate from the other components of the main processor 3100.

In some example embodiments, the main processor 3100 may include the image signal processing device 100 and/or the machine vision device MVD described with reference to FIGS. 1 to 15. For example, the main processor 3100 may receive the raw pixel code provided from the image capture device 3410 and may generate the downsized pixel code. The main processor 3100 may perform the machine visioning operation based on the downsized pixel code. In detail, the main processor 3100 may perform one or more of various functions such as object identification, object recognition, object detection, motion detection, video-tracking, and/or edge detection.

The memories 3200a and/or 3200b may be used as main memory devices of the system 3000. Although each, or one or more, of the memories 3200a and/or 3200b may include a volatile memory, such as static random access memory (SRAM) and/or dynamic RAM (DRAM), each, or one or more, of the memories 3200a and/or 3200b may include non-volatile memory, such as a flash memory, phase-change RAM (PRAM) and/or resistive RAM (RRAM). The memories 3200a and/or 3200b may be implemented in the same package as the main processor 3100.

The storage devices 3300a and/or 3300b may serve as non-volatile storage devices configured to store data regardless of whether power is supplied thereto, and have larger storage capacity than the memories 3200a and/or 3200b. The storage devices 3300a and/or 3300b may respectively include storage controllers (STRG CTRL) 3310a and/or 3310b and NVM (Non-Volatile Memory)s 3320a and/or 3320b configured to store data via the control of the storage controllers 3310a and/or 3310b. Although the NVMs 3320a and 3320b may include flash memories having a two-dimensional (2D) structure or a three-dimensional (3D) V-NAND structure, the NVMs 3320a and/or 3320b may include other types of NVMs, such as PRAM and/or RRAM.

The storage devices 3300a and/or 3300b may be physically separated from the main processor 3100 and included in the system 3000 or implemented in the same package as the main processor 3100. In addition, the storage devices 3300a and/or 3300b may have types of solid-state devices (SSDs) and/or memory cards and be removably combined with other components of the system 3000 through an interface, such as the connecting interface 3480 that will be described below. The storage devices 3300a and/or 3300b may be devices to which a standard protocol, such as a universal flash storage (UFS), an embedded multi-media card (eMMC), and/or a non-volatile memory express (NVMe), is applied, without being limited thereto.

The image capturing device 3410 may capture still images and/or moving images. The image capturing device 3410 may include a camera, a camcorder, and/or a webcam. In some example embodiments, the image capture device 3410 may include the image sensor device 10 described with reference to FIGS. 1 to 15, may include the image sensor device 20 described with reference to FIGS. 16 and 17, and/or may include the image sensor device 1000 described with reference to FIG. 18.

The user input device 3420 may receive various types of data input by a user of the system 3000 and include a touch pad, a keypad, a keyboard, a mouse, and/or a microphone.

The sensor 3430 may detect various types of physical quantities, which may be obtained from the outside of the system 3000, and convert the detected physical quantities into electric signals. The sensor 3430 may include a temperature sensor, a pressure sensor, an illuminance sensor, a position sensor, an acceleration sensor, a biosensor, and/or a gyroscope sensor.

The communication device 3440 may transmit and/or receive signals between other devices outside the system 3000 according to various communication protocols. The communication device 3440 may include an antenna, a transceiver, and/or a modem.

The display 3450 and the speaker 3460 may serve as output devices configured to respectively output visual information and auditory information to the user of the system 3000.

The power supplying device 3470 may appropriately convert power supplied from a battery (not shown) embedded in the system 3000 and/or an external power source, and supply the converted power to each, or one or more, of components of the system 3000.

The connecting interface 3480 may provide connection between the system 3000 and an external device, which is connected to the system 3000 and capable of transmitting and receiving data to and from the system 3000. The connecting interface 3480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and/or a compact flash (CF) card interface.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

According to some example embodiments of the inventive concepts, an image signal processing device that downsizes image data for machine vision and an operation method of the image signal processing device may be provided. According to some example embodiments of the inventive concepts, when a machine vision system is implemented using the downsized image data, the computation of the machine vision system may decrease. Accordingly, a processing speed of the machine vision system may be improved, and power consumption thereof may decrease.

While the inventive concepts have been described with reference to some example embodiments thereof, it will be apparent to those of ordinary skill in the art that various changes and modifications may be made thereto without departing from the spirit and scope of the inventive concepts as set forth in the following claims.

What is claimed is:

1. An operation method of an image signal processing device, the method comprising:
receiving a raw pixel code from an external image sensor device including an image pixel;
generating a non-linear pixel code by performing non-linear mapping for the raw pixel code; and
outputting a downsized pixel code obtained by performing a masking operation on a plurality of bit positions including a first bit position corresponding to a most significant bit of the non-linear pixel code and a second bit position corresponding to a least significant bit of the non-linear pixel code,
wherein an amplitude of the raw pixel code is linear to illuminance of a light incident onto the image pixel,
wherein an amplitude of the non-linear pixel code is non-linear to the amplitude of the raw pixel code, and
wherein the non-linear pixel code has a first code length, and the downsized pixel code has a second code length smaller than the first code length.

2. The method of claim 1, wherein the generating the non-linear pixel code includes:
mapping the raw pixel code to a non-linear pixel value; and
converting the non-linear pixel value into the non-linear pixel code based on the first code length.

3. The method of claim 2, wherein the mapping the raw pixel code to the non-linear pixel value includes:
determining a first function for the non-linear mapping; and
mapping the raw pixel code to the non-linear pixel value so that the non-linear pixel value and the amplitude of the raw pixel code have a relationship of the first function.

4. The method of claim 3, wherein a function value of a first derivative to the amplitude of the raw pixel code of the first function is "0" or more, and
wherein a function value of a second derivative to the amplitude of the raw pixel code of the first function is "0" or less.

5. The method of claim 3, wherein the first function is a logarithmic function.

6. The method of claim 2, wherein the converting the non-linear pixel value into the non-linear pixel code includes:
normalizing an interval, in which the non-linear pixel value is capable of being included, to $2^N$ intervals; and
determining the non-linear pixel code by identifying an interval, in which the non-linear pixel value is included, from among the $2^N$ intervals,
wherein N is equal to a number of bits of the first code length.

7. The method of claim 6, wherein the interval in which the non-linear pixel value is capable of being included is:
an interval between a first non-linear pixel value corresponding to a first raw pixel code whose amplitude is "0" and a second non-linear pixel value corresponding to a second raw pixel code being a full-code.

8. The method of claim 1, wherein the downsized pixel code corresponds to remaining bit positions of the non-linear pixel code other than the plurality of bit positions, and
wherein the remaining bit positions are adjacent to each other.

9. The method of claim 1, further comprising:
detecting an event based on a change of the downsized pixel code.

10. The method of claim 1, wherein a code length of the raw pixel code is 8-bit or more.

11. The method of claim 10, wherein the second code length is 1-bit or more and 4-bit or less.

12. The method of claim 11, wherein a number of bits of the first code length is smaller than or equal to a number of bits of the raw pixel code.

13. An image system comprising:
an image sensor device including first processing circuitry configured to
generate a first raw pixel code based on a light of first illuminance,
generate a second raw pixel code based on a light of second illuminance, and
generate a third raw pixel code based on a light of third illuminance; and
an image signal processing device including second processing circuitry configured to
receive the first raw pixel code, the second raw pixel code, and the third raw pixel code,
generate a first non-linear pixel code based on the first raw pixel code, a second non-linear pixel code based on the second raw pixel code, and a third non-linear pixel code based on the third raw pixel code,
generate a first downsized pixel code by masking some bit positions of the first non-linear pixel code, code, a second downsized pixel code by masking some bit positions of the second non-linear pixel code, and a third downsized pixel code by masking some bit positions of the third non-linear pixel code, and
output the first downsized pixel code, the second downsized pixel code, and the third downsized pixel code,
wherein the second illuminance is higher than the first illuminance and is lower than the third illuminance,
wherein a ratio of an amplitude difference of the first raw pixel code and the second raw pixel code to a difference of the first illuminance and the second illuminance corresponds to a ratio of an amplitude difference of the second raw pixel code and the third raw pixel code to a difference of the second illuminance and the third illuminance, and
wherein a ratio of an amplitude difference of the first non-linear pixel code and the second non-linear pixel code to the difference of the first illuminance and the second illuminance is greater than a ratio of an amplitude difference of the second non-linear pixel code and the third non-linear pixel code to the difference of the second illuminance and the third illuminance.

14. The image system of claim 13, wherein the second processing circuitry is further configured to:
map the first raw pixel code to a first non-linear pixel value, map the second raw pixel code to a second non-linear pixel value, and map the third raw pixel code to a third non-linear pixel value; and
convert the first non-linear pixel value into the first non-linear pixel code by quantizing the first non-linear pixel value, convert the second non-linear pixel value into the second non-linear pixel code by quantizing the second non-linear pixel value, and convert the third non-linear pixel value into the third non-linear pixel code by quantizing the third non-linear pixel value.

15. The image system of claim 13, wherein each of the first non-linear pixel code, the second non-linear pixel code, and the third non-linear pixel codes has a first code length,
wherein each of the first downsized pixel code, the second downsized pixel code, and the third downsized pixel code has a second code length,
wherein the second code length is smaller than the first code length, and
wherein the second code length is 1-bit or more and 4-bit or less.

16. The image system of claim 13, wherein the second processing circuitry is further configured to:
map the first raw pixel code to a first non-linear pixel value based on a logarithmic function, map the second raw pixel code to a second non-linear pixel value based on the logarithmic function, and map the third raw pixel code to a third non-linear pixel value based on the logarithmic function.

17. The image system of claim 13, wherein the second processing circuitry is further configured to:
generate the first downsized pixel code by masking a plurality of bits of the first non-linear pixel code, generate the second downsized pixel code by masing the plurality of bits of the second non-linear pixel code, and generate the third downsized pixel code by masking the plurality of bits of the third non-linear pixel code, the plurality of bits including a least significant bit and a most significant bit.

18. An image sensor device comprising:
a pixel array including a plurality of image pixels configured to generate a plurality of analog pixel voltages, respectively;
an analog-to-digital converter configured to convert the plurality of analog pixel voltages into a plurality of raw pixel codes, respectively;
an image signal processor configured to
generate a plurality of non-linear pixel codes each having a first code length, by performing non-linear mapping for the plurality of raw pixel codes; and
generate a plurality of downsized pixel codes by masking some bit positions of each of the plurality of non-linear pixel codes; and
an output buffer configured to receive the plurality of downsized pixel codes and to output a downsized image.

19. The image sensor device of claim 18, wherein a code length of each of the plurality of raw pixel codes is 8-bit or more, and
wherein a code length of each of the plurality of downsized pixel codes is 4-bit or less.

20. The image sensor device of claim 18, wherein the image signal processor is configured to:
generate the plurality of downsized pixel codes by masking a plurality of bits of each of the non-linear pixel codes, the plurality of bits including a least significant bit and a most significant bit.

* * * * *